(12) United States Patent
Haapanen et al.

(10) Patent No.: US 9,489,154 B1
(45) Date of Patent: Nov. 8, 2016

(54) SYSTEM, APPARATUS AND METHOD FOR TRACKING AND MANAGING DEVICES

(71) Applicants: Tom Haapanen, Heidelberg (CA); Matt Cecile, Waterloo (CA)

(72) Inventors: Tom Haapanen, Heidelberg (CA); Matt Cecile, Waterloo (CA)

(73) Assignee: RICOH COMPANY, LTD., Tokyo (JP)

(*) Notice: Subject to any disclaimer, the term of this patent is extended or adjusted under 35 U.S.C. 154(b) by 0 days.

(21) Appl. No.: 14/934,093

(22) Filed: Nov. 5, 2015

(51) Int. Cl.
*G06F 3/12* (2006.01)

(52) U.S. Cl.
CPC .......... *G06F 3/1203* (2013.01); *G06F 3/1236* (2013.01); *G06F 3/1286* (2013.01)

(58) Field of Classification Search
CPC .............. G06F 3/1236; G06K 15/402; H04N 1/32534
See application file for complete search history.

(56) References Cited

U.S. PATENT DOCUMENTS

| | | | |
|---|---|---|---|
| 8,891,106 B1 | 11/2014 | Haapanen | |
| 9,122,433 B2 | 9/2015 | Haapanen | |
| 9,130,838 B2 | 9/2015 | Anderson et al. | |
| 2003/0151766 A1* | 8/2003 | Clough | G06F 3/1222 358/1.15 |
| 2012/0265865 A1 | 10/2012 | Tanaka et al. | |
| 2012/0266073 A1 | 10/2012 | Tanaka et al. | |
| 2014/0222980 A1 | 8/2014 | Hagiwara et al. | |
| 2014/0223325 A1 | 8/2014 | Melendez et al. | |

OTHER PUBLICATIONS

U.S. Appl. No. 14/735,251, Tom Haapanen et al., Jun. 10, 2015.
U.S. Appl. No. 14/926,978, Tom Haapanen et al., Oct. 29, 2015.

* cited by examiner

*Primary Examiner* — Benny Q Tieu
*Assistant Examiner* — Haris Sabah
(74) *Attorney, Agent, or Firm* — Cooper & Dunham LLP

(57) ABSTRACT

Tools, such as systems, apparatuses and methodologies, are provided to track and manage devices in a network, based on information retrieved from network switches in the system.

17 Claims, 25 Drawing Sheets

*User:* Jimmy Hart

Home  Devices  Reports  Files  Options  Logout

Switches and Corresponding Connected Devices

| (Switch Identifier (corresponding location) | Protocol | Port | Device (model) | Action |
|---|---|---|---|---|
| Office203 (FL-203) <br><br> Delete  Edit | OpenFlow | 100 | Public Printer (Pro C751) | Delete  Edit |
| | | 101 | John's MFP (Aficio SP) | Obtain Access |
| | | 102 | Jack-PC (HP Laptop 90) | Delete  Edit |
| Office204 (FL-204) <br><br> Delete  Edit | OpenFlow | 202 | (none) | Delete  Edit |
| | | 203 | Public Scanner (ScanFast) | Delete  Edit |
| Basement (Basement) <br><br> Delete  Edit | Generic | X | B. Facsimile (Ultra Fax 93) | Delete  Edit |
| | | Z | (none) | Delete  Edit |
| RoofSwitch (Roof) <br><br> Obtain Access | | | | |
| ConfRoom32 (Conference Room) <br><br> Obtain Access | | | | |

Add Switch and/or Device

Fig. 9C

*User:* Jimmy Hart

| Home | Devices | Reports | Files | Options | Logout |

Switches and Corresponding Connected Devices

| (Switch Identifier (corresponding location) | Protocol | Port | Device (model) | Action |
|---|---|---|---|---|
| RoofSwitch (Roof) Obtain Access | | | | |
| ConfRoom32 (Conference Room) Obtain Access | | | | |

Access to Switch "ConfRoom32"

Please input password to gain access to the switch "ConfRoom32" as well as to view all devices connected to the switch "ConfRoom32".

Password: ******************

[ OK ] [ Cancel ]

[ Add Switch and/or Device ]

Fig. 9D

*User:* Jimmy Hart

| Home | Devices | Reports | Files | Options | Logout |

Switches and Corresponding Connected Devices

| (Switch Identifier (corresponding location) | Protocol | Port | Device (model) | Action |
|---|---|---|---|---|
| RoofSwitch (Roof) Obtain Access | | | | |
| ConfRoom32 (Conference Room) Obtain Access | | | | |

Access to Device "John's MFP"

Please input password to gain access to the device "John's MFP".

Password  ******************

OK    Cancel

Delete   Edit

Add Switch and/or Device

Fig. 9E

*User:* Jimmy Hart

Home | Devices | Reports | Files | Options | Logout

Switches and Corresponding Connected Devices

| (Switch Identifier (corresponding location) | Protocol | Port | Device (model) | Action |
|---|---|---|---|---|
| Office203 (FL-203)  Delete  Edit | OpenFlow | 100 | Public Printer (Pro C751) | Delete  Edit |
| | | 101 | John's MFP (Aficio SP) | Delete  Edit |
| | | 102 | Jack-PC (HP Laptop 90) | Delete  Edit |
| Office204 (FL-204)  Delete  Edit | OpenFlow | 202 | (none) | Delete  Edit |
| | | 203 | Public Scanner (ScanFast) | Delete  Edit |
| Basement (Basement)  Delete  Edit | Generic | X | B. Facsimile (Ultra Fax 93) | Delete  Edit |
| | | Z | (none) | Delete  Edit |
| RoofSwitch (Roof)  Delete  Edit | Catalyst | 11 | (none) | Delete  Edit |
| ConfRoom32 (Conference Room)  Delete  Edit | 3com | 65 | Conference Room Printer (Inkjet 89) | Delete  Edit |

Add Switch and/or Device

Fig. 9F

Edit Device Information for Device "Jack-PC"

| | | | |
|---|---|---|---|
| Identifier | Mailroom Printer | Model No: | Laser Nova |
| Type | Printer | Protocol: | OpenFlow |
| MAC Address | 6E:14:D5:3E:96:B8 | Security Password? | ************ |

Move Device to Another Location?  ● Yes   ○ No

| | | | |
|---|---|---|---|
| Authorized by: | Rick Parsons | New switch (port) | Office204 (Port 202) |
| Authorization Date | August 31, 2015 | Duration of Authorization | 3 days |

OK    Cancel

| ConfRoom32 (Conference Room) Delete  Edit | 3com | 65 | Conference Room Printer (Inkjet 89) | Delete  Edit |
|---|---|---|---|---|

Add Switch and/or Device

Fig. 9G

*User:* Jimmy Hart

Home　Devices　Reports　Files　Options　Logout

Add Switch/Device Information　[ Switch ▽ ]

| | | | |
|---|---|---|---|
| Identifier | Mailroom 2 | Model No: | Boadcom 9876 |
| Location | Mailroom (2ⁿᵈ Floor) | Security Password? | ************ |
| Protocol | OpenFlow | | |
| Ports | [ 3 ▽ ]  [ 10 ] | | |
| | [ 11 ] | | |
| | *Type Port Identifier Here* | | |

OK　Cancel

| | | | | | |
|---|---|---|---|---|---|
| ConfRoom32 (Conference Room) Delete　Edit | 3com | 65 | Conference Room Printer (Inkjet 89) | Delete | Edit |

Add Switch and/or Device

Fig. 9H

*User:* Jimmy Hart

Home　Devices　Reports　Files　Options　Logout

Switches and Corresponding Connected Devices

Add Switch/Device Information　　Device ▽

| | | | | |
|---|---|---|---|---|
| Identifier | Mailroom Printer | Model No: | Laser Nova | |
| Type | Printer ▽ | Switch: | Mailroom 2 (port 10) ▽ | |
| MAC Address | 9F:14:27:0E:96:B8 | Date Added | August 31, 2015 ▽ | |
| Security Password? | ************ | | | |

OK　Cancel

| ConfRoom32 (Conference Room) Delete　Edit | 3com | 65 | Conference Room Printer (Inkjet 89) | Delete　Edit |

Add Switch and/or Device

Fig. 9I

Status Changes

Connection of the following devices have changed:

---

*TIM-98 (Model: RICOH PRO C751)*

| | |
|---|---|
| MAC Address: 01:23:45:A7:89:5B | MAC Address: 01:23:45:A7:89:5B |
| Switch Identifier: Tim | Switch Identifer: Alice |
| Port Number: 100 | Port Number: 102 |
| Location: Tim's Office | Location: Alice's Office |
| Time Stamp: September 7, 2015 | Time Stamp: September 8, 2015 |

Authorizatization: Rick Parsons (CEO) authorized the move on Saturday, September 5, 2015

Action: Update device database with new switch, location and port number of *TIM-98 (Model: RICOH PRO C751)*

---

*Public Printer (Model: Xerox Laser Nova)*

| | |
|---|---|
| MAC Address: | MAC Address: |
| Switch Identifier: Conference | Switch Identifer: Conference |
| Port Number: 258 | Port Number: 369 |
| Location: Conference Room | Location: Conference Room |
| Time Stamp: October 1, 2015 | Time Stamp: October 1, 2015 |

Authorizatization: Jimmy Hart (IT Manager) authorized the move on Monday, September 7, 2015

Action: Update device database with new port number of *Public Printer (Model: Xerox Laser Nova)*

[ Back ]

Fig. 12

Device Status Change

The status of the following machines has changed:

TIM-98 (Model: RICOH PRO C751)

MAC Address: 01:23:45:A7:89:5B
Switch Identifier: Tim
Port Number: 100
Location: Tim's Office
Time Stamp: September 7, 2015

MAC Address: 01:23:45:A7:89:5B
Switch Identifer: Alice
Port Number: 102
Location: Alice's Office
Time Stamp: September 7, 2015

Authorizatization: No Record of Authorization

Action: Although there is no record of authorization, would you like to permit the change anyway?

[ Yes, update database with new change ]   [ No, do not perform update ]

Public Printer (Model: Xerox Laser Nova)

MAC Address: Unknown
Switch Identifier: None
Port Number: None
Location: None
Time Stamp: September 12, 2015

MAC Address: 08:00:27:0E:25:B8
Switch Identifer: Conference
Port Number: 369
Location: Conference Room
Time Stamp: September 15, 2015

Authorizatization: Jimmy Hart (IT Manager) authorized the move on Monday, September 7, 2015

Action: Update device database with new port number of *Public Printer (Model: Xerox Laser Nova)*

[ Back ]

Fig. 15

SYSTEM, APPARATUS AND METHOD FOR TRACKING AND MANAGING DEVICES

TECHNICAL FIELD

This disclosure relates to systems, apparatuses and methodologies, for tracking and managing devices in a system over network, and more specifically, to such systems, apparatuses and methodologies to utilize information retrieved from network switches in the system to track and manage devices in the system.

BACKGROUND

In the current information age, information technology (IT) tools are extensively used in enterprises and other organizations in order to manage the operation of network-connected devices such as multi-function devices (MFDs). A conventional device management system may be used by a network administrator to install and manage a plurality of network-connected devices.

However, devices are often configured for plug-and-play. That is, the device is configured to connect automatically to an available network connection, without manual setting by an authorized administrator. Thus, in an office environment, a user can move a device from one network connection to another network connection, and in some instances, even attach a new device to a network, without an administrator and without authorization. As an example, a common problem for network administrators is not being informed when a multi-function device or printer is physically moved from one location to another. For example, when a printer or MFP has wheels, it can be easily pushed to move it to another location. When a device is moved without knowledge of the administrator, support and maintenance of the device becomes very difficult since the device cannot be located by the administrator or support staff.

There remains a need for provisions in an asset or device management system to detect and track devices moved or added to a network.

SUMMARY

Asset or device management systems or application software that enables network administrators to manage a fleet of devices (such as multi-function devices, printers, etc.), and perform tasks such as applying fleet-wide settings, firmware updates, application updates, etc., can be configured to access managed network switches used in the network environment and detect physical movement of devices by monitoring the ports of the network switches and detecting when the ports or connected devices change.

A database of device data and device information is maintained for managed devices in the system. Such data and information can include for a network switch, for example, switch name, description, manufacturer, model, network address, communication protocol to be used, security credentials. For monitoring network switch port usage, the administrator enters device and port information, to facilitate the process to query the switches for port usage. The authorized administrator, upon entry of the security credentials, can also add a switch, edit switch information, and delete a switch.

In an example, SNMP (Simple Network Management Protocol) queries may be transmitted to the switches to ascertain what ports on the switch are used by which MAC (media access control) addresses, and MAC addresses are maintained in the database for all of the managed devices. Security credentials may be required to access the port/device data using SNMP or similar protocol.

The switches can be polled, via communication by SNMP (or another similar method), periodically or on the basis of a schedule specified by the administrator (e.g., approximately hourly, in order to alert the administrator to a potential problem quickly, rather than waiting for a help desk call regarding a missing device), or at least from time to time, to retrieve the list of active MAC addresses and corresponding port addresses for each network switch, and the data obtained from the network switches is compared to the device data maintained in the database for each managed device. Each manufacturer and model of network switch may use a different format or communication protocol for its port information, and therefore the communication with the device may be tailored for each type of device and the software for the communication component is written using a modular architecture.

As an example, the system retrieves port data obtained from each of the network switches, and compares it to the existing port numbers (i.e. maintained in the database) for each of the devices, to determine any devices that have changed to a different port on the switch or to a new switch altogether, and if there is any inconsistency, update the database as necessary and/or notify the administrator.

When it has been determined that a device has changed ports on a switch or changed to a different switch, an alert can be sent (e.g., within the application, by e-mail, by messaging, or by some other appropriate notification mechanism) to the administrator so that they can physically locate the device and either move it back to its original location or update their records concerning the device's new location. On the other hand, the system can be configured to support a workflow to request and approve device location changes, whether made by in-house staff or by outside support staff, such as device supplier or other support service. If the device move has been pre-authorized, no alert is generated for a change in port location.

The administrator may additionally maintain human-readable location information for each device, including maintaining switch, port and connection information, and such information may be integrated in the database with the system-obtained device port data, to enable the system to produce a report of the current physical locations of all the devices.

Additionally, by maintaining historical information of device port locations, the system can determine at (approximately) what time the device move occurred. This device move history report can then be used by an administrator to narrow down the time of the move, both from the original location and to the new location. The security administrator can then use this time window to identify the person or persons who actually moved the device.

BRIEF DESCRIPTION OF THE DRAWINGS

The aforementioned and other aspects, features and advantages can be more readily understood from the following detailed description with reference to the accompanying drawings wherein:

FIGS. 9A-9I show respective examples of user interface screens provided by an asset (or device) management application, according to an exemplary embodiment;

FIG. 12 shows an example of a notification provided by an asset (or device) management application, according to an exemplary embodiment;

FIG. 15 shows an example of a notification provided by an asset (or device) management application, according to an exemplary embodiment;

DETAILED DESCRIPTION

Figure 1:
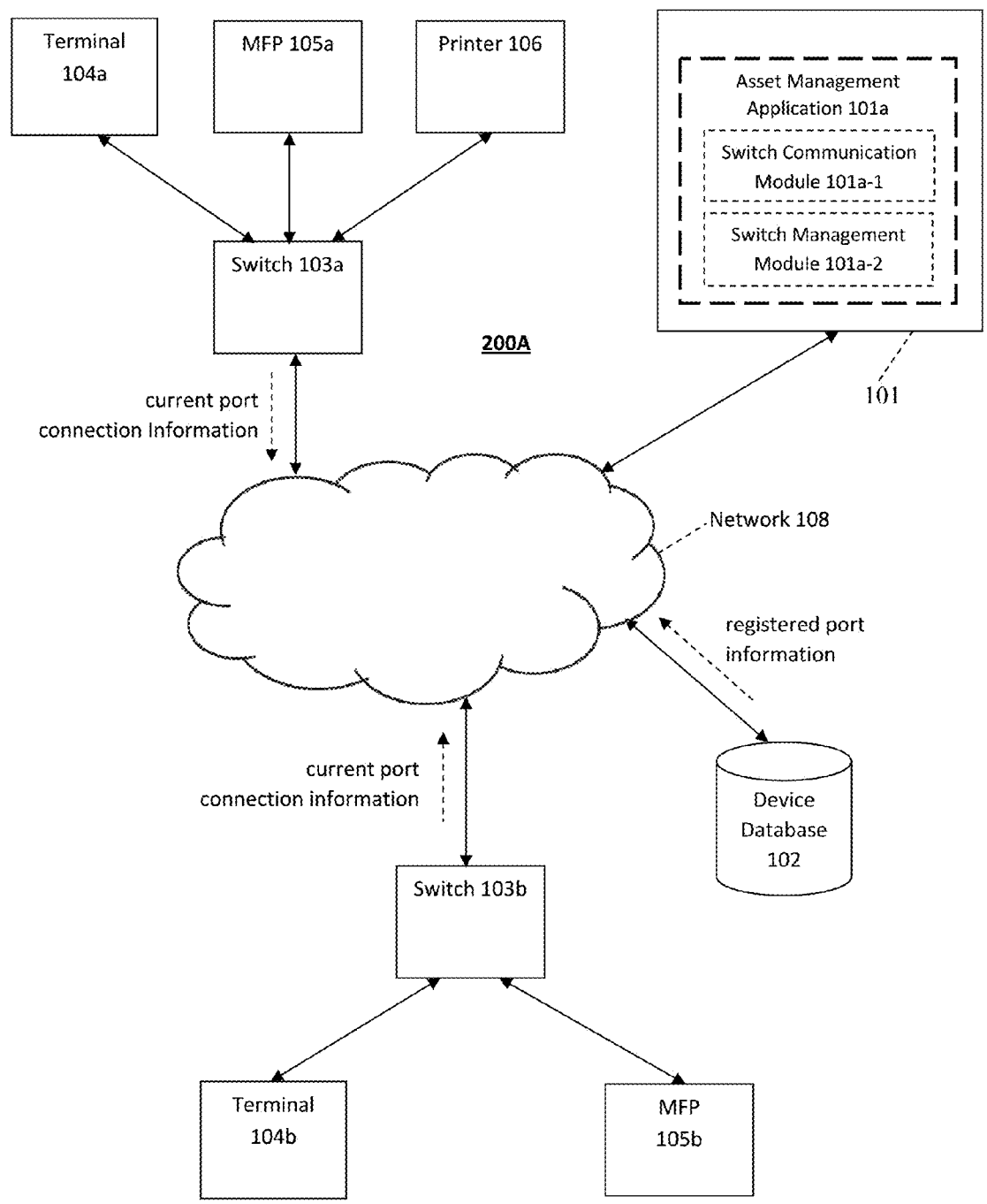
FIG. 1 shows a block diagram of a system for tracking and managing devices over a network, according to an exemplary embodiment.

In describing preferred embodiments illustrated in the drawings, specific terminology is employed herein for the sake of clarity. However, this disclosure is not intended to be limited to the specific terminology so selected and it is to be understood that each specific element includes all technical equivalents that operate in a similar manner. In addition, a detailed description of known functions and configurations is omitted from this specification when it may obscure the inventive aspects described herein.

Various tools are discussed herein to facilitate device management, such as via an asset or device management application. It should be appreciated by those skilled in the art that any one or more of such tools may be embedded in the application and/or in any of various other ways, and thus while various examples are discussed herein, the inventive aspects of this disclosure are not limited to such examples described herein.

Referring now to the drawings, wherein like reference numerals designate identical or corresponding parts throughout the several views, FIG. 1 shows schematically a system 200A including terminal 101, device database 102, network switches 103a and 103b, terminals 104a and 104b, MFP 105a and 105b and printer 106, and in such system 200A, the terminal 101, the device database 102, the device switches 103a and 103b are interconnected by a network 108.

The terminal 101 can be any computing device, including but not limited to a personal, notebook or workstation computer, a kiosk, a PDA (personal digital assistant), a mobile phone or handset, another information terminal, etc., that can communicate with other devices through the network 104. The terminal 101 is further described infra with reference to FIG. 5.

In the system shown in FIG. 1, an asset (or device) management application 101a is provided to or on terminal 101 and includes a switch communication module 101a-1 and a switch management module 101a-2. Such application software may be stored in memory of the terminal 101 and/or may be downloaded from an external source. While FIG. 1 focuses on inventive aspects of such management application 101a in connection with managing a fleet of devices, it should be understood that the term "asset management application" can refer to any application software that may provide a user with facilities and functions to track and manage devices in a system over a network, and that the application software may have other facilities and functions, not shown in the drawings.

The switch communication module 101a-1 performs communication, via a network interface, with one or more switches (e.g., device switch, Ethernet switch, etc.) connected to a network (such as network 108 in FIG. 1). The switches may include one or more ports, the ports being connected to one or more devices (such as terminals 104a and 104b, MFPs 105a and 105b and printer 106, in FIG. 1). Further, each of the switches may conform to a different communication protocol (i.e. API). For example, switches manufactured by some manufacturers utilizes the OpenFlow protocol, while switches manufactured by some manufacturers utilize the Catalyst protocol. As a result, the switch communication module 101a-1 may be configured to communicate with different types of switches which are manufactured by various manufacturers.

The switch management module 101a-2 manages each of the devices connected to the ports on the switches. To facilitate this, the switch management module 101a-2 communicates with a database (such as database 102 in FIG. 1) to obtain one or more lists of information corresponding to the switches such as name, device identifier, media access control (MAC) address, number of ports, port identifiers, physical location, protocols, standards, API, etc. After obtaining the switch information from the database, the switch management module 101a-2 may communicate with the switches that are currently connected to the network, to obtain switch information that is more recent (e.g., current) relative to the switch information registered in the database. For example, in an exemplary embodiment, such switch information may be initially registered in the database by a user, such as an administrator.

Next, the switch management module 101a-2 extracts registered port connection information in the switch information obtained from the database and extracts current port connection information in the switch information obtained from the network. The registered port connection information and the current port connection information both contain information regarding which ports of a certain switch are connected to which device. For example, the registered port connection information may show that "Ethernet switch A" has a "Port A" which is connected to "Printer X" and a "Port B" which is connected to "Personal Computer Y". After performing the extraction, the switch management module 101a-2 compares the registered port connection information with the current port connection information. In case that nothing within the network has changed (i.e. no devices have been added, removed or moved), the registered port connection information and the current port connection information should have the same information (or values).

However, there may be a case in which there is a discrepancy between the registered port connection information and the current port connection information. In other words, it is possible that one or more devices have been added, removed or moved. For example, it may be that a "Printer XYZ" is currently registered in the database as connected to "Port 79" of "Ethernet switch FL-30". When the switch management module 101a-2 obtains the switch information from the network, the switch information may indicate that "Printer XYZ" is no longer connected to "Port 79" of "Ethernet switch FL-30". Instead, the "Printer XYZ" may be connected to a "Port 456" of "Ethernet switch B011". Thus, when an inconsistency occurs, the switch management module 101a-2 may notify the administrator that such change has happened. The notification may be via a notification feature on the management application 101a or may be via another messaging method (e.g., e-mail, SMS, etc.). After the administrator is notified, he or she may determine whether the inconsistency was authorized. For example, it is possible that the "Printer XYZ" may have been moved due to an order by an executive level manager. In such a case, the administrator may permit the switch management module 101a-2 to update the information in the device database corresponding to this change. On the other hand, the inconsistency may not have been authorized. As a result, the administrator may dispatch his or her subordinate to investigate the reasons for this inconsistency.

The device database 102 is a database that stores information about the switches and devices that are currently in the network. The device database 102 may store (i) switch information such as switch identifier, model no., protocol, location, ports, etc. and (ii) device information such as device identifier, model no., MAC address, location, port connected to, etc. The device database 102 may also send registered port connection information (stored in the device database 102) which may be information regarding (i) ports of the switches currently connected to the network 108 (e.g., switches 103a and 103b) and (ii) the MAC address of devices connected to that port. The management application 101a on the terminal 101 may utilize the received registered port connection in combination with information obtained directly from the switches (e.g., switches 103a and 103b) connected to the network 108 to periodically updated the device database 102.

The switch 103a facilitates communication between devices connected to ports on the switch 103a (e.g., terminal 104a, MFP 105a, printer 106, etc.) and the network 108 via the MAC protocol. Similarly, the switch 103b also facilitates communication between devices connected to ports on the switch 103b (e.g., terminal 104b, MFP 105b, etc.) to the network 108 via MAC protocol. The switches 103a and 103b may store information regarding each of the devices connected to each of the switches 103a and 103b. Such information may include properties of the device (e.g., device type, device identifier, model no., etc.) and current port connection information (i.e. port number and MAC address of device connected to the port number). Thus, the management application 101a on the terminal 101 may request such current port connection information from each of the switches 103a and 103b to determine which devices are connected to each of the switches 103a and 103b. From this information, the management application 101a may also be able to determine whether any changes in the network 108 have occurred (e.g., missing device, new device added, device location change, etc.) by comparing the registered port connection information obtained from the device to the current port connection information. The switches 103a and 103b are further described infra with reference to FIG. 7.

The terminals 104a and 104b can be any computing device, including but not limited to a personal, notebook or workstation computer, a kiosk, a PDA (personal digital assistant), a mobile phone or handset, another information terminal, etc., that can communicate with other devices through the network 108. The terminals 104a and 104b are further described infra with reference to FIG. 5.

The terms "printer" and "printer device" are used hereinafter generically to include any output device having a printing or plotting functionality, and include multifunction devices having a copy and/or scanning functionality in addition to the printing or plotting functionality.

Figure 6:
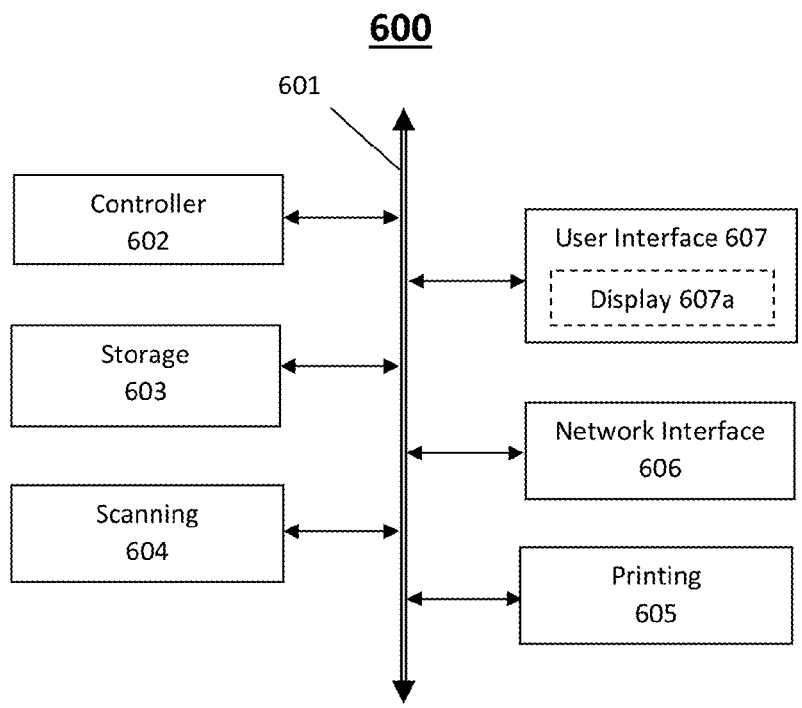
FIG. 6 shows a block diagram of an exemplary configuration of a multi-function device.

The MFPs 104a and 104b can be, for example a printer/scanner, printer/scanner/fax, etc. While this example of this disclosure simply refers to MFPs 104a and 104b and a single printer 106 in the interest of brevity, it should be appreciated that the network environment can have an arbitrary number of printer and MFP devices. The MFPs 104a and 104b may be configured as shown in FIG. 6, which is discussed infra.

The network 108 can be a local area network, a wide area network or any type of network such as an intranet, an extranet (for example, to provide controlled access to external users, for example through the Internet), a private or public cloud network, the Internet, etc., or a combination thereof. In addition, the network 108 preferably uses TCP/IP (Transmission Control Protocol/Internet Protocol), but other protocols such as SNMP (Simple Network Management Protocol) and HTTP (Hypertext Transfer Protocol) can also be used. How devices can connect to and communicate over networks is well known in the art and is discussed for example, in "How Networks Work", by Frank J. Derfler, Jr. and Les Freed (Que Corporation 2000) and "How Computers Work", by Ron White, (Que Corporation 1999), the entire contents of each of which are incorporated herein by reference.

Figure 2:
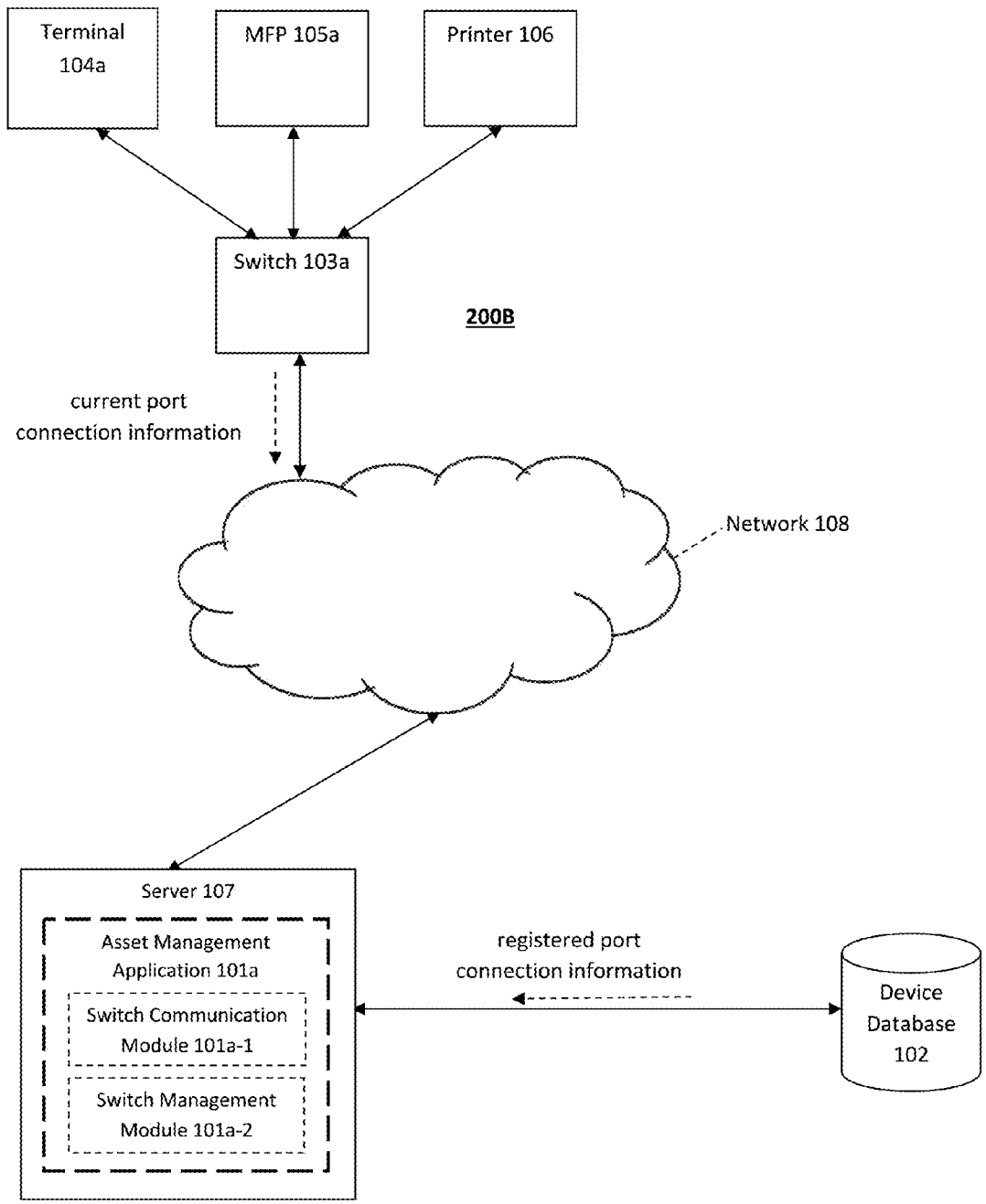
FIG. 2 shows a block diagram of a system for tracking and managing devices over a network, according to another exemplary embodiment.

FIG. 2 shows schematically a system 200B, according to another exemplary embodiment. The system 200B is similar to the system 200A of FIG. 1 except that management application 101a is on a server 107 and device database 102 in the system is directly connected to the server 107.

The server 107 may be a server which contains the management application 101a and may be remotely accessible by a user utilizing a terminal such as 104a. In other words, the device that the user is utilizing does not need to have the management application 101a stored thereon. The user can access the management application 101a on the server 107 instead.

The device database 102 may not necessarily be connected to the network 108. In other words, the device database 102 may be directly connected to the server 107 thereby permitting the management application 101a on the server 107 to directly access contents (e.g., device and switch information) stored by the device database 102. Further, the management application 101a may also periodically update the device database 102.

Otherwise, operations of the elements of the system 200B are similar to those discussed in connection with the corresponding elements of the system 200A of FIG. 1.

Figure 3A:
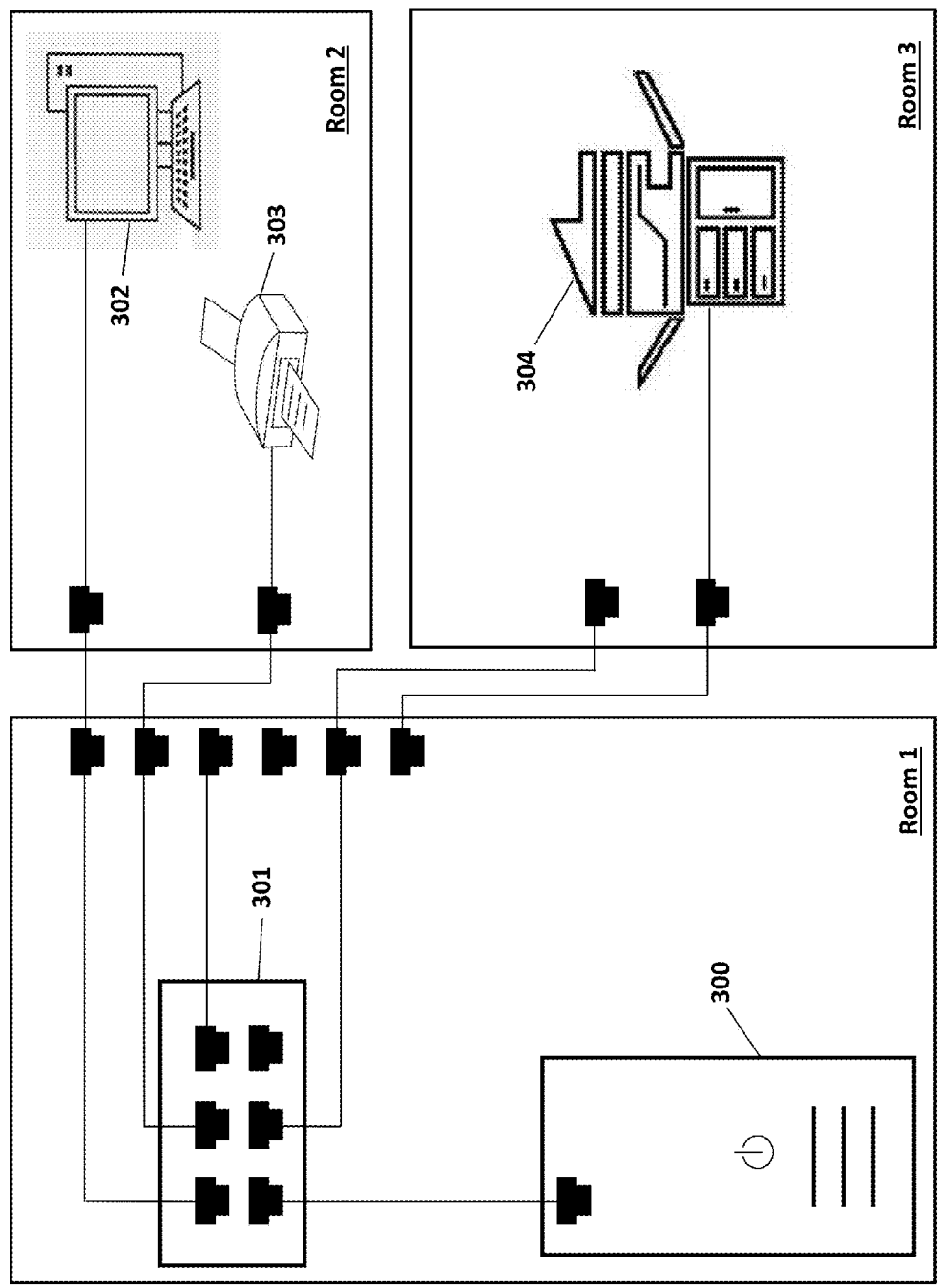
FIGS. 3A and 3B show schematic diagrams of examples of connections of a network switch in an office environment.

FIG. 3A shows an exemplary configuration of an office which includes (but is not limited to) three rooms (i.e. "Room 1", "Room 2", "Room 3"). For example, "Room 1" may be a server room in which a terminal 300 is disposed at. It should be noted that the terminal 300 may be a server that includes a database to store information. Such terminal 300 may be connected to a switch 301 which includes one or more ports. In turn each of the ports are connected (e.g., via an Ethernet cable) to an Ethernet port on, for example, a wall of "Room 1". The "Room 1" Ethernet ports are in turn connected (e.g., via wires) to Ethernet ports of, for example, walls on "Room 2" and "Room 3". The "Room 2" Ethernet ports and the "Room 3" Ethernet ports can be connected (e.g., via an Ethernet cable) to various devices. In other words, any device connected to a "Room 2" Ethernet port (e.g., terminal 302 and printer 303) can communicate with a device connected to a "Room 1" Ethernet port (e.g., switch 300). It should be noted that the connection between, for example, a single "Room 1" Ethernet port and a since corresponding "Room 2" Ethernet port is a one-to-one connection. It is not necessary, as discussed previously, to have one single switch designated to one location. Stated another way, a portion of the ports on a switch (e.g., ports 1, 2, 3) can be designated to one location while the remaining portion (e.g., ports 4, 5, 6) can be designated to another location.

Figure 3B:
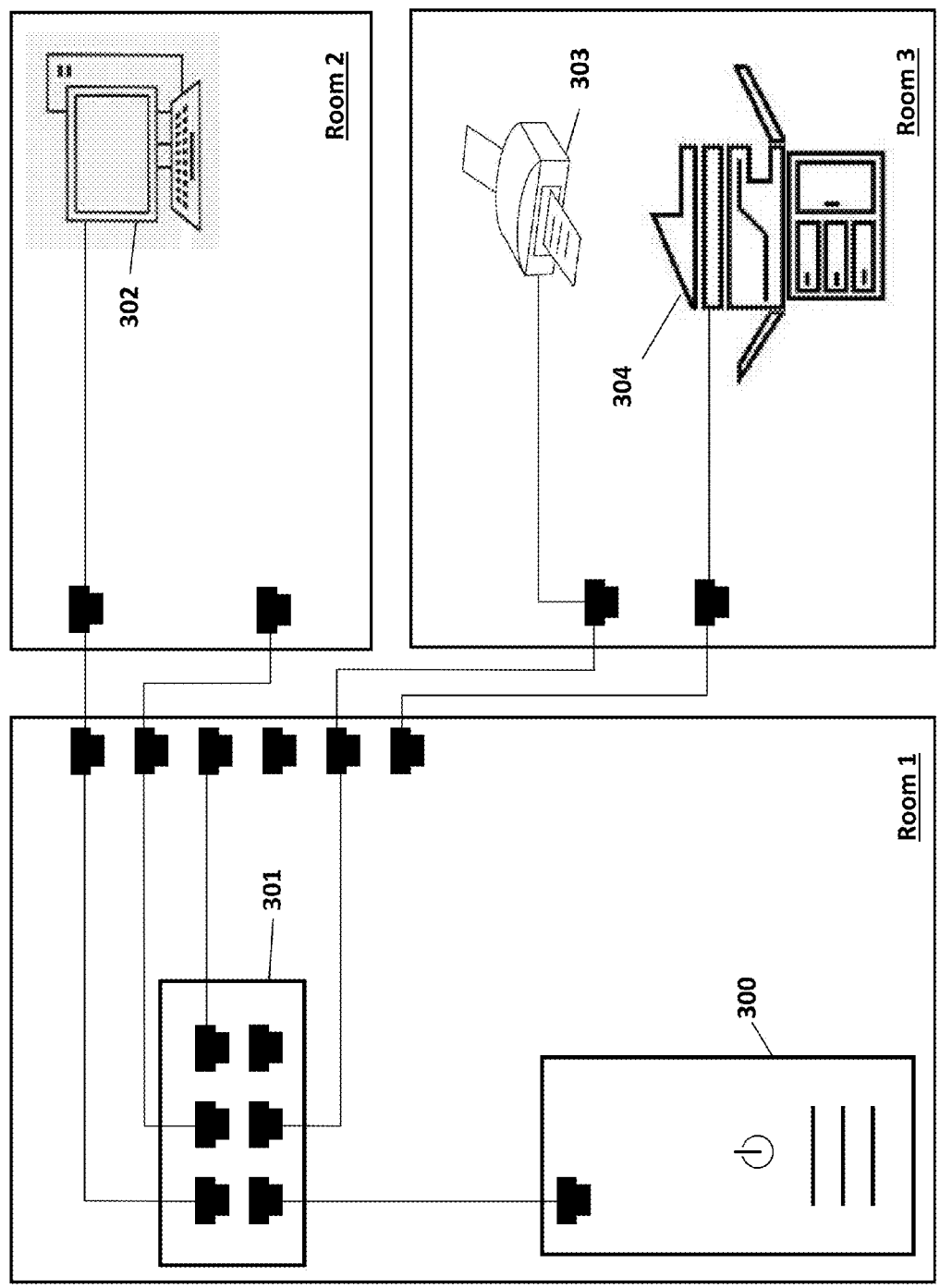

FIG. 3B shows a configuration of an office similar to that in FIG. 3A. However, there is a difference in that the printer 303 has now been moved from "Room 2" to a new location (i.e. "Room 3"). Thus, there is a change in the network. Since the terminal 300 monitors the network (including the switch 302) at periodic intervals to determine if there is a change, the terminal 300 is notified that the printer 303 has changed locations by comparing registered port connection information (e.g., ports of switch 302 and MAC address of printer 303) stored in the database inside the terminal 300 to current port information (e.g., ports of switch 302 and MAC address of printer 303) obtained directly from a switch (e.g., switch 302). Further, since the registered port connection information in the database in the terminal 300 may be out of date, the terminal 300 may utilize the current port connection information to perform updates to the database.

Figure 4:
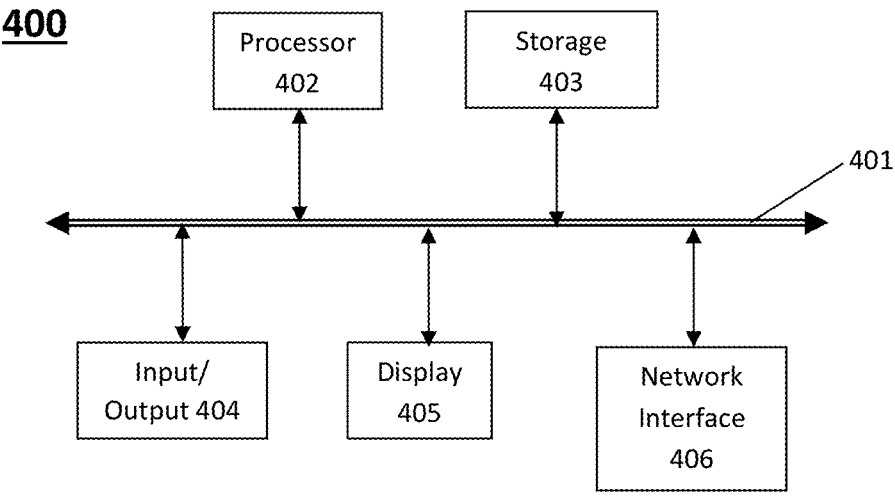
FIG. 4 shows a block diagram of an exemplary configuration of a computing device.

FIG. 4 shows an exemplary constitution of a computing device that can be configured (for example, through software) to operate (at least in part) as the server 107 of FIG. 2 (or the terminal 101 in FIG. 1). As shown in FIG. 4, apparatus 400 includes a processor (or central processing unit) 402 that communicates with a number of other components, including memory or storage part 403, other input/output (e.g., keyboard, mouse, etc.) 404, display 405 and network interface 406, by way of a system bus 401. The apparatus 400 may be a special-purpose device (such as including one or more application specific integrated circuits or an appropriate network of conventional component circuits) or it may be software-configured on a conventional personal computer or computer workstation with sufficient memory, processing and communication capabilities to operate as a terminal and/or server, as should be appreciated by those skilled in the relevant art.

In the management apparatus 400, the processor 402 executes program code instructions that control device operations. The processor 402, memory/storage 403, input/output 404, display 405 and network interface 406 are conventional, and therefore in order to avoid obfuscating the inventive aspects of this disclosure, such conventional aspects are not discussed in detail herein.

The apparatus 400 includes the network interface 406 for communications through a network, such as communications through the network 108 with a switch (e.g., switch 103a in FIG. 2; switches 103a and 103b, in FIG. 1). However, it should be appreciated that the subject matter of this disclosure is not limited to such configuration. For example, the apparatus 400 may communicate with client terminals through direct connections and/or through a network to which some components are not connected. As another example, the apparatus 400 does not need to be provided by a server that services terminals, but rather may communicate with the devices on a peer basis, or in another fashion.

The apparatus 400 of the present disclosure is not limited to a server or computer, but can be manifested in any of various devices that can be configured to communicate over a network and/or the Internet.

Figure 5:
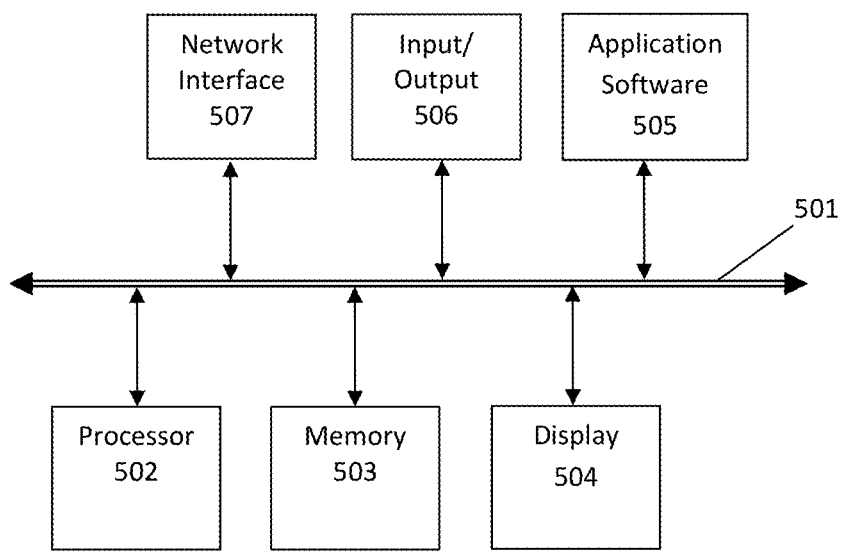
FIG. 5 shows a block diagram of an exemplary configuration of a terminal.

An exemplary constitution of the terminal apparatus 101 of FIG. 1 is shown schematically in FIG. 5. In FIG. 5, terminal 500 includes a processor (or central processing unit) 502 that communicates with various other components, such as memory (and/or other storage device) 503, display 504, application software 505, input/output (such as keyboard, mouse, touchpad, stylus, microphone and/or speaker with voice/speech interface and/or recognition software, etc.) 506 and network interface 507, by way of an internal bus 501.

The memory 503 can provide storage for program and data, and may include a combination of assorted conventional storage devices such as buffers, registers and memories [for example, read-only memory (ROM), programmable ROM (PROM), erasable PROM (EPROM), electrically erasable PROM (EEPROM), static random access memory (SRAM), dynamic random access memory (DRAM), non-volatile random access memory (NOVRAM), etc.].

The network interface 507 provides a connection (for example, by way of an Ethernet connection or other network connection which supports any desired network protocol such as, but not limited to TCP/IP, IPX, IPX/SPX, NetBEUI, etc.) to the network to which the computer 500 is connected (e.g., network 108 of FIG. 1).

Additional aspects or components of the computer 500 are conventional (unless otherwise discussed herein), and in the interest of clarity and brevity are not discussed in detail herein. Such aspects and components are discussed, for example, in "How Computers Work", by Ron White (Que Corporation 1999), and "How Networks Work", by Frank J. Derfler, Jr. and Les Freed (Que Corporation 2000), the entire contents of each of which are incorporated herein by reference.

FIG. 6 shows a schematic diagram of a configuration of a printing device as an MFP (multi-function printer or multi-function peripheral), which can be any apparatus (including a microprocessor chip or a collection of devices having varying degree of integration) that has the ability to perform two or more image forming functionalities. The MFP 600 shown in FIG. 6 includes a controller 602, and various elements connected to the controller 602 by an internal bus 601. The controller 602 controls and monitors operations of the MFP 600. The elements connected to the controller 602 include storage 603 (for example, random access memory, read-only memory, hard disk drive, portable storage media drive such as for optical discs, magnetic discs, magneto optical discs, etc., semiconductor memory cards, combinations of storage media, etc.), scanning 604, printing 605, a network interface (I/F) 606 and a user interface 607.

Storage 603 can include one or more storage parts or devices [e.g., a read only memory (for example, ROM, PROM, EPROM, EEPROM, etc.), a random access memory (RAM), a hard disk drive (HDD), portable media (for example, floppy disk, optical disc, magnetic discs, magneto-optical discs, semiconductor memory cards, etc.) drives], and program code instructions can be stored in one or more parts or devices of storage 603 and executed by the controller 602 to carry out the instructions. Such instructions can include instructions for performing specified functions (such as printing, scanning, faxing, copying, e-mailing, etc.) of the MFP 600, to enable the MFP 600 to interact with a terminal, as well as perhaps other external devices, through the network interface 606, and interactions with users through the user interface 607.

The network interface 606 is utilized by the MFP 600 to communicate with other network-connected devices such as a terminal, a server and receive data requests, print jobs, user interfaces, and etc.

The user interface 607 includes one or more electronic visual displays that display, under control of controller 602, information allowing the user of the MFP 600 to interact with the MFP 600. The electronic visual display can be any of various conventional displays (such as a liquid crystal display, a plasma display device, a cathode ray tube display, etc.), but preferably is equipped with a touch sensitive display (for example, liquid crystal display) and is configured to provide a GUI (graphical user interface) based on information input by an operator of the MFP 600, so as to allow the operator to interact conveniently with services provided on the MFP 600, or with the MFP 600 serving as terminal for accessing electronic data or other content through the network. User interfaces or other contents received through the network via the network interface 606 can be displayed on the display screen.

The display screen does not need to be integral with, or embedded in, a housing of the MFP 600, but may simply be coupled to the MFP 600 by either a wire or a wireless connection. The user I/O 607 may include keys and/or buttons (such as graphical keys or buttons, or other graphical elements, of a GUI on a touchscreen display 607a) for inputting information or requesting various operations. Alternatively, the user I/O 607 and the display screen may be operated by a keyboard, a mouse, a remote control, voice recognition, or eye-5 movement tracking, or a combination thereof.

Since the MFP 600 is typically shared by a number of users, and is typically stationed in a common area, the MFP 600 preferably prompts the user to supply login credentials or authentication information, such as user name (or other user or group information), password, access code, etc. The user credentials may also be stored for the session and automatically supplied if access to other devices (or assets) through the network requires it. On the other hand, such other devices may prompt the user to supply other user credentials through the user interface.

Other methods of authentication may also be used. For example, the MFP 600 may be equipped with a card reader or one or more biometrics means (such as comparing fingerprints, palm prints, voice or speech, retinas or irises, facial expressions or features, signature, etc.). The MFD 600 may communicate the user credentials, provided in the manners discussed above, to other devices or applications connected to the MFP 600 via a network (e.g., the network 108 of FIG. 1 and FIG. 2) for determining authorization for performing jobs.

Scanning 604, printing 605, and network interface 607 are otherwise conventional, and therefore, a detailed description of such conventional aspects is omitted in the interest of clarity and brevity. The MFP 600 can have any or all of the functions of similar devices conventionally known, such as for scanning, editing and storing images, sending a fax, sending and receiving e-mails with or without attachments, accessing files by FTP or another protocol or facility, surfing the Web, scan-to-folder, scan-to-email, etc. Further, multifunctional devices or multi-function peripheral devices can play a prominent role to convert hardcopy documents to electronic documents.

Figure 7:
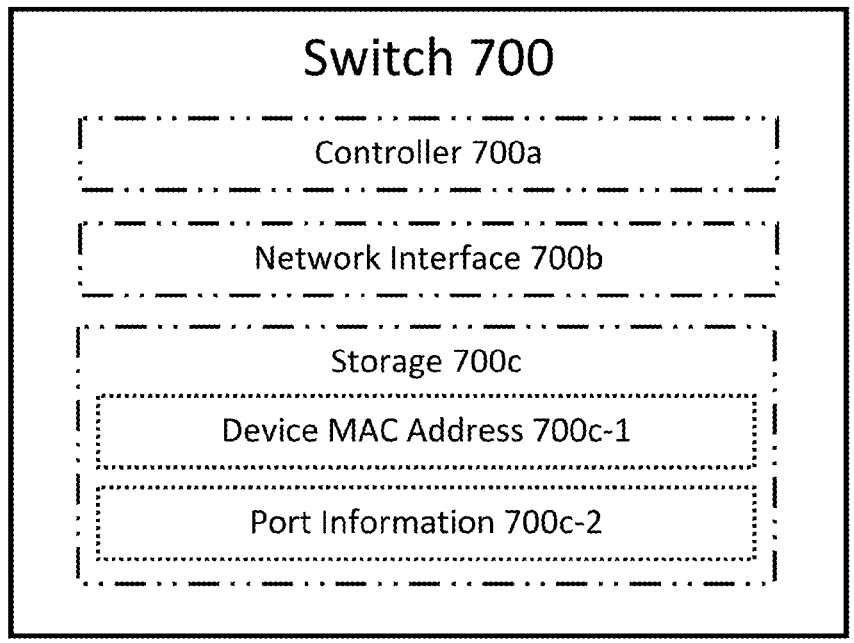
FIG. 7 shows a block diagram of an exemplary configuration of a network switch.

FIG. 7 shows a schematic diagram of a configuration of a switch 701, which can be any apparatus (including a microprocessor chip or a collection of devices having varying degree of integration) that has the ability to facilitate communication between devices and a network (e.g., network 108). The switch 700, for example, may be an "intelligent" switch and thus may include a controller 700a which causes communication to be performed via a network interface 700b and causes information to be stored in a storage 700c.

The network interface 700b to configured to establish a connection (for example, by way of an Ethernet connection or other network connection which supports any desired network protocol such as, but not limited to TCP/IP, IPX, IPX/SPX, NetBEUI, etc.) with a network to which the switch 700 is connected (e.g., network 108 of FIG. 1). Further, the network interface 700b includes device ports (e.g., Ethernet ports) to permit the switch 700 to be connected to (and facilitate communication between) a variety of devices. When the network interface 700b receives communication from each of the devices, the switch 700b may obtain information from each of the devices (e.g., MAC address) and store such information in the storage 700c. The storage 700b may store information such as, but not limited to, device MAC address 700c-1, for each of the devices connected to the ports of the switch 700, and port information 700c-2, indicating the port numbers (e.g., port 1, port 2, etc.) to which each of the devices are connected (or registered to). The combination of the device MAC address 700c-1 and the port information 700c-2 may collectively be referred to herein as port connection information or port information. In addition, in an exemplary embodiment, the switch 700 may also store information regarding properties of the connected devices (e.g., device identifier, device type, model no., IP address, etc.). When the switch 700 receives a request from a management application (e.g., management application 101a of FIGS. 1 and 2), the switch 700 may, via the network interface 700b, send the information stored in the storage 700b (e.g., device MAC address 700c-1, port information 700c-2, etc.) to the management application.

Figure 8:
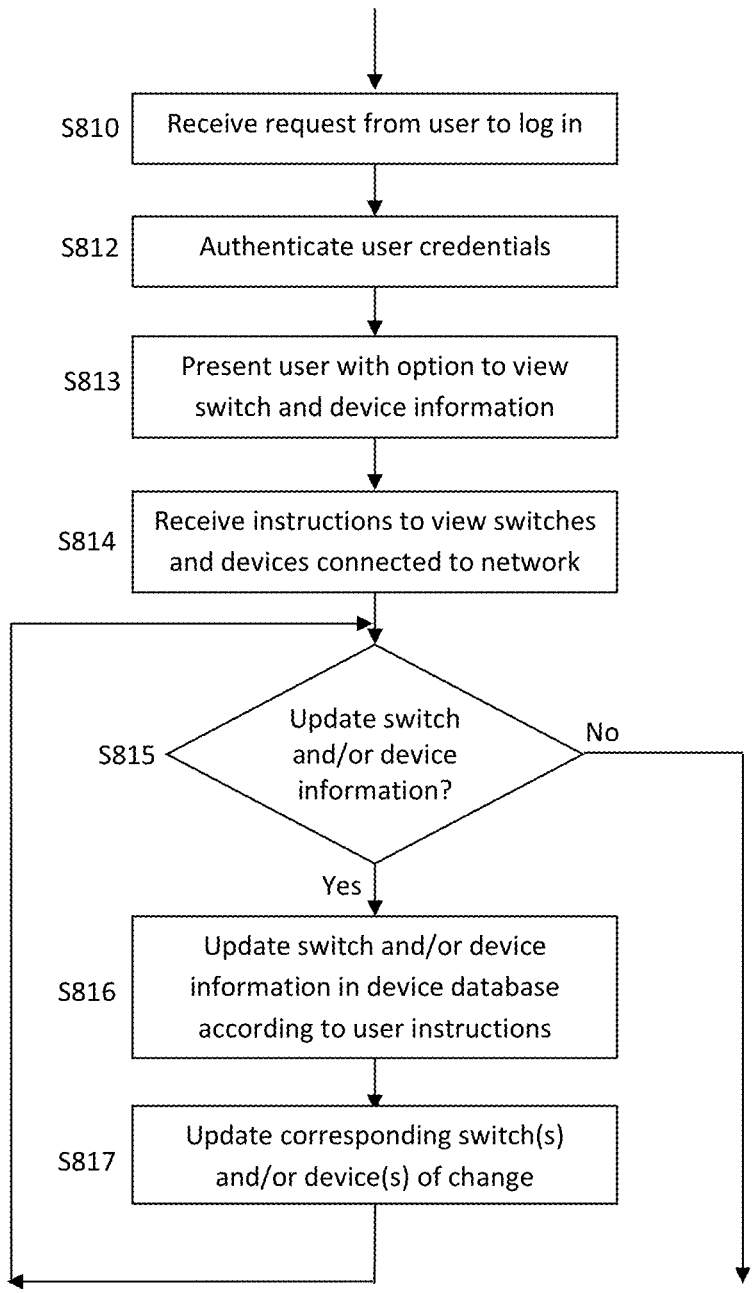
FIG. 8 shows a flow chart of a method that can be performed in the system shown in FIG. 1 and/or in the system shown in FIG. 2.

FIG. 8 shows a process or workflow performed by an asset or device management application (e.g., 101a) on a terminal apparatus (e.g., 101), according to an exemplary embodiment.

In this exemplary scenario, a user ("Jimmy Hart") may be an administrator working at a company that possesses a large building which contains many offices, each of which includes a plurality of devices (e.g., printers, MFPs, facsimiles, scanners, personal computers, laptops, tablets, notebook computers, etc.) that are connected to a network (e.g., network 108 in FIG. 1) via, for example, switches. However, there may be a problem in that, since the building is extremely large (i.e. hundreds of offices), it would be difficult for an administrator to monitor every device (and their corresponding movements) in the company. For example, devices in the company may be moved around or added/ removed from the network. Such movement or addition/ removal may be performed independently by employees or departments without notifying administrators or an information technology (IT) department. Consequently, when devices go missing or change locations, an administrator has difficulty in locating such devices. Further, in another example, many times employees leave the company for a variety of reasons (e.g., new job, going back to school, retirement, etc.). As a result, their offices may be left empty until new employees are hired to replace them. In this time interval of between leaving and hiring, existing employees may attempt to take, without authorization, devices that were left in the now-empty offices. Like previously, the administrator also has difficulty in locating these missing devices. To solve such aforementioned issues, a user or an administrator may utilize a management application (e.g., management application 101a in FIG. 1) to actively monitor the devices in the building.

Figure 9A:
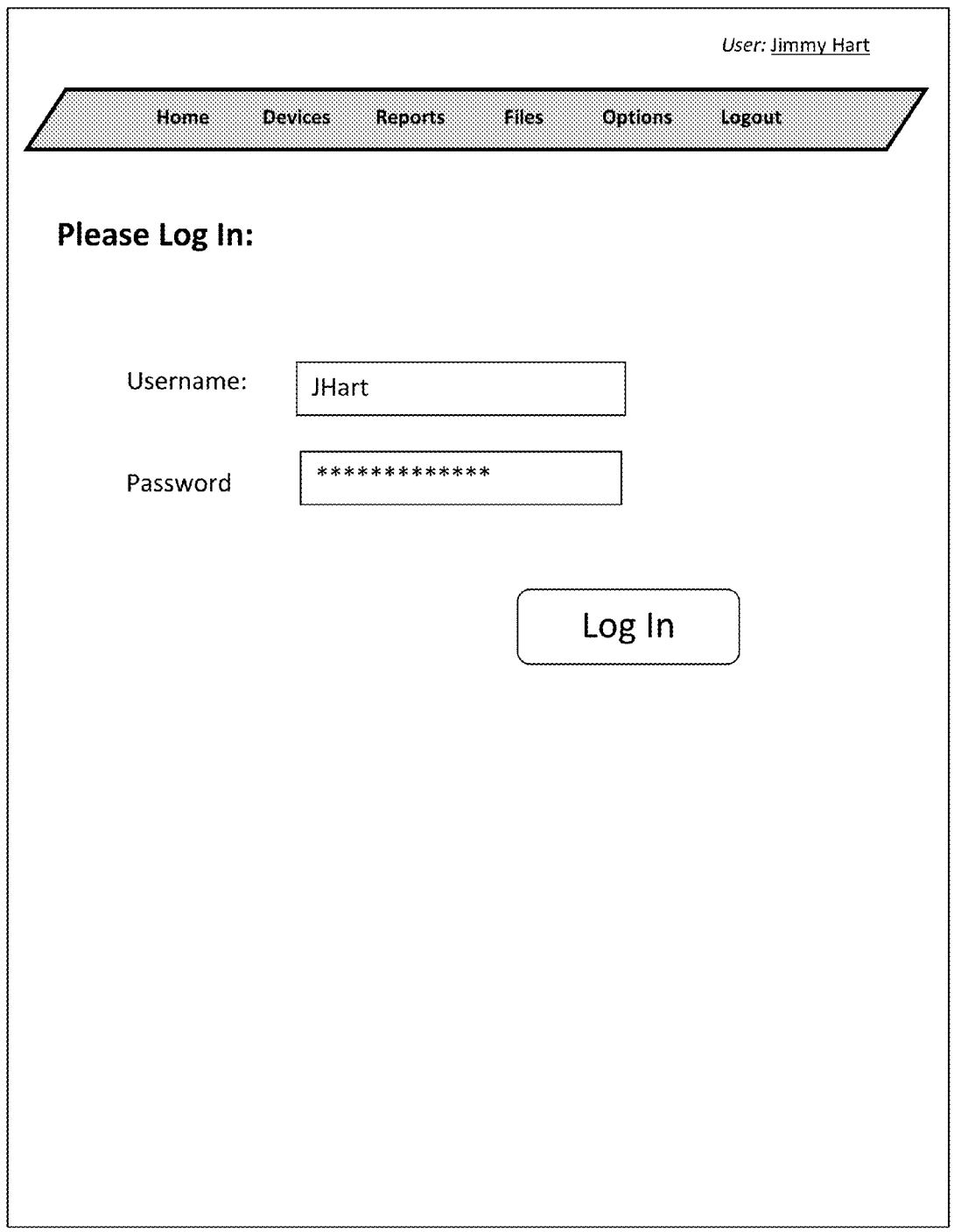
Figure 9B:
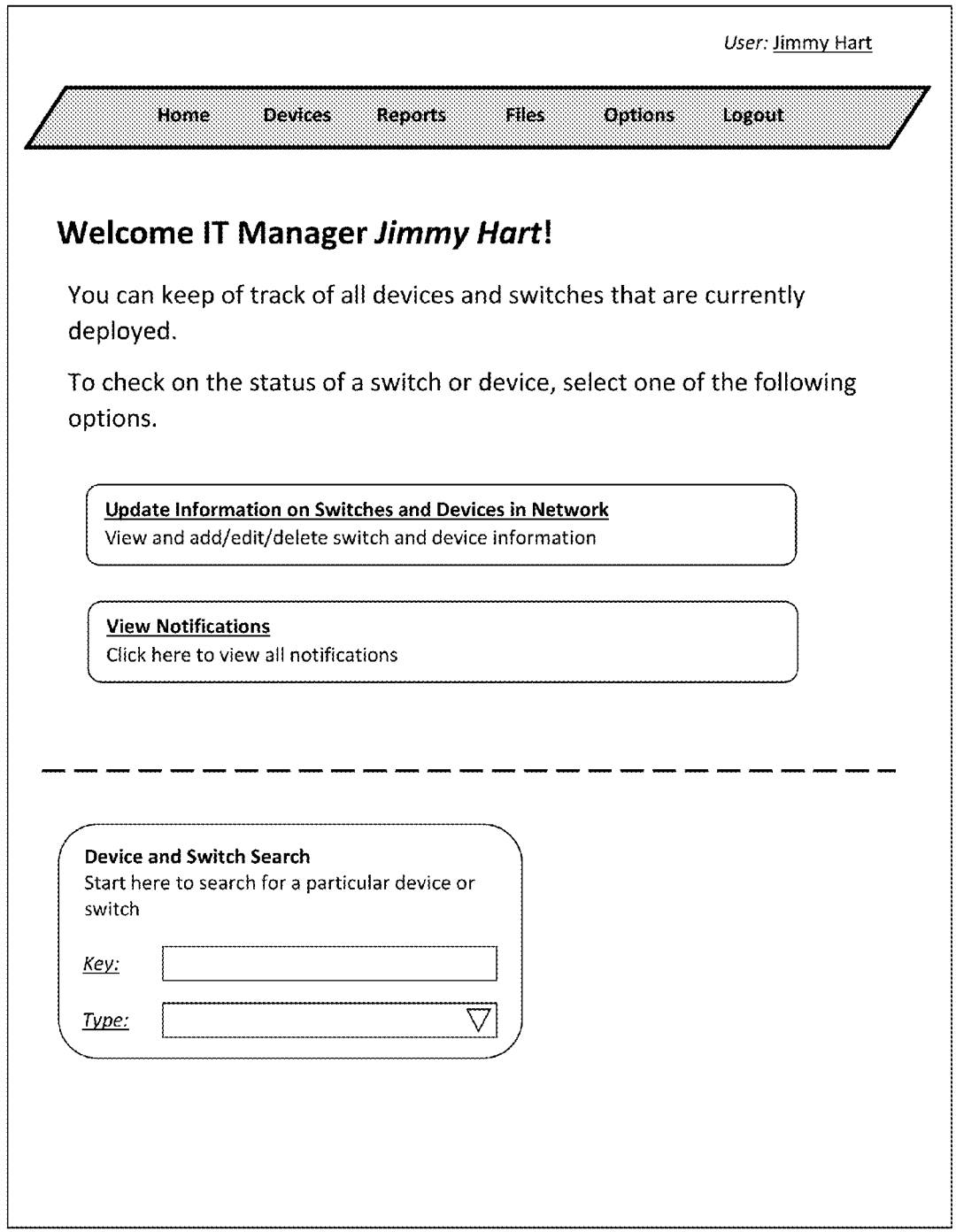

Such process commences when the user uses the terminal apparatus (e.g., terminal 101 in FIG. 1, server computer 107 in FIG. 2, etc.) to access the management application (e.g., management application 101a) by logging in through a user interface, such as shown in FIG. 9A, by inputting user credentials which may include a username and password (step S810). After receiving the user credentials, the management application proceeds to authenticate the user (step S811). Next, the management application presents a user interface, such as shown in FIG. 9B, to provide the user with the option to (i) view any notifications regarding the switches and devices connected to the network and (ii) view information regarding switches and devices connected to the network (step S812). Subsequently, the management application may receive a request from the user to view information regarding switches and devices connected to the network (step S813). After receiving the instruction from the user, the management application may provide to the user a screen, such as the one in FIG. 9C, which shows a table containing switches currently monitored by the management application including their properties (e.g., switch identifier, location, protocol, number of ports, ports, etc.) and all the corresponding devices connect to the switches including their properties (e.g., device identifier, model, type, etc.).

However, for added security, not all of the switches and corresponding devices may be viewable by the user. For example, to edit information on the switch "ConfRoom 32", the user activates the corresponding "Obtain Access" button which causes the management application to request the user to input security credentials (e.g., password) as shown in FIG. 9D. Once the management application authenticates the security credentials, the user may be allowed accessed to at least one of the devices connected to the now accessible switch. In an exemplary embodiment, even if the user has access to the switch by entering security credentials, the user may still need to enter security credentials for the other devices connected to the now accessible switch. For example, in this case, the user has access to the switch "Office203". However, the user cannot access the device "John's MFP" unless the user activates the corresponding "Obtain Access" button which causes the management application to request the user to input security credentials as shown in FIG. 9E. Once the management application authenticates the security credentials, the user may be allowed accessed to the device "John's MFP".

Next, for this particular case, the user has obtained access for all switches and devices shown in FIG. 9F. Thus, the user can select to update the information in the device database (step S815). In the case that the user does not want to update the information (step S815, no), the workflow ends. Otherwise (step S815, yes), the user may select to update the information by a variety of methods.

For example, the user may edit the information for existing switches or devices in the table by activating the corresponding "Edit" button. In this case, the user selects to edit the device "Jack-PC" which causes the management application to provide a user interface screen as shown in FIG. 9G. Here, the user can edit basic properties (e.g., identifier, type, MAC address, Model no., protocol, security credentials, etc.) of the device "Jack-PC". Further, the user can also authorize movement of the device. In other words, for example, an executive manager may want to move the device "Jack-PC" to another location. Such executive manager may want to inform the user of his or her intentions before the move actually takes place. As a result, the user may register the person who authorized the move, the date of authorization, the new switch and port that the device is be connected to, and the duration of the authorization. The duration of the authorization is the time period that the device is to be permitted to move from its present location to the new location specified by the user. In the case that the duration of authorization period expires, the device cannot be moved without a new authorization registered by the user.

In another example, the user may add switches or devices to the database by activating the "Add Switch and/or Device" button, which causes a user interface screen, such as that shown in FIG. 9H, to be presented to the user. In the case, the user has selected to add a switch by inputting properties (e.g., identifier, location, protocol, ports and corresponding number of ports, model no., security credentials, etc.). Similarly, the user can also add a device, assign said device to a switch and input properties of the device (e.g., identifier, type, MAC address, Model no., device added date, etc.), such as shown in FIG. 9I. In yet another example, the user may also delete switch and/or device information by activating the corresponding "Delete" button.

After the management application has performed the changes (i.e. updates) to the switch and/or device information in the device database according to the user instructions (step S816), the management application communicates directly with each switch and device in the network and performs the same update on them (step S817).

Figure 10:
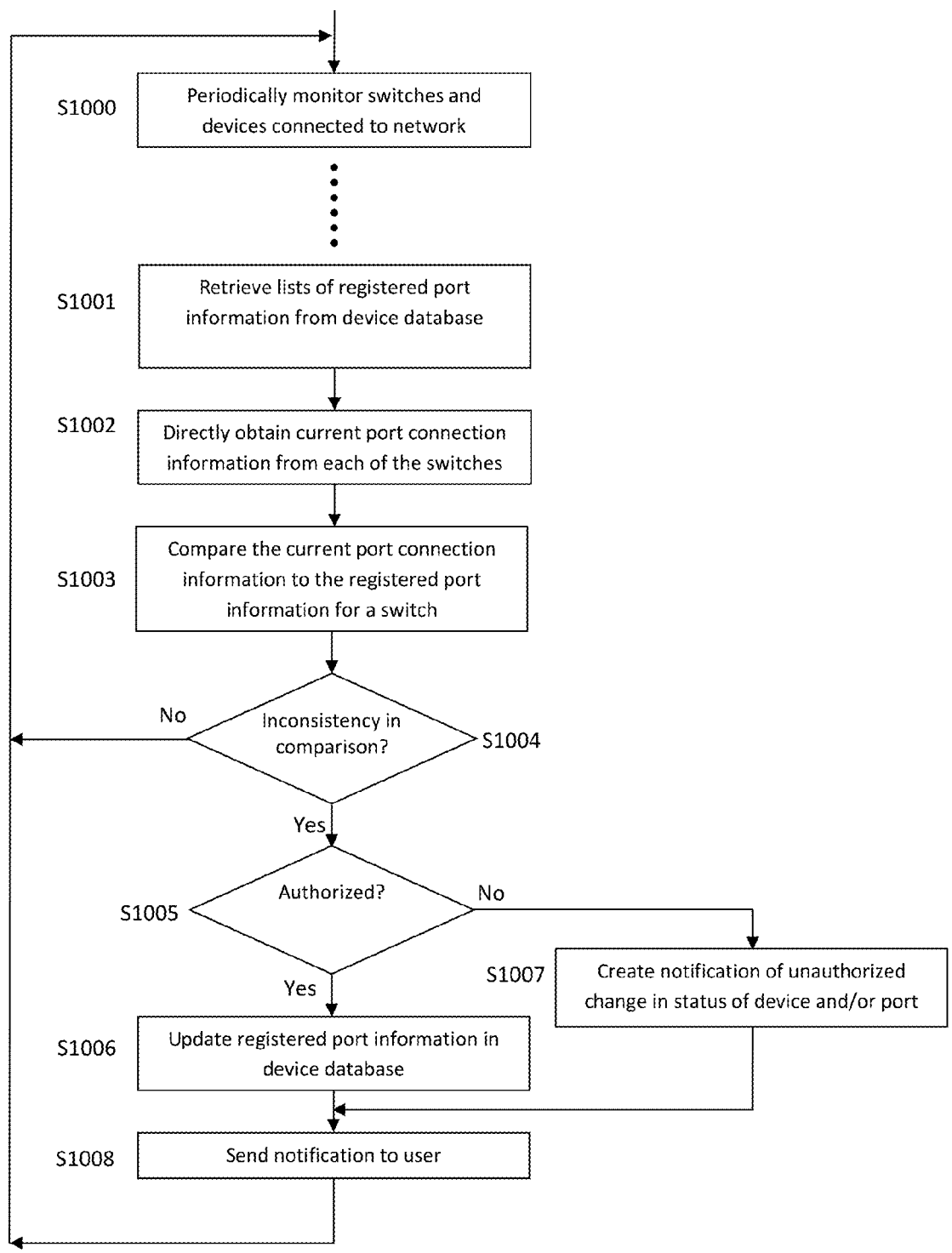
FIG. 10 shows a flow chart of a method that can be performed in the system shown in FIG. 1 and/or in the system shown in FIG. 2.

FIG. 10 show a device or process or workflow performed by an asset or device management application (e.g., 101a), according to an exemplary embodiment.

After the user such as an administrator (e.g., "Jimmy Hart") has set up the network which includes switches and devices that are connected to said switches, the management application (e.g., management application 101a of FIGS. 1 and 2) may monitor periodically (e.g., 2 hours, 6 hours, 12 hours, 1 day, 1 week, 1 month, etc.) the network to determine if any changes have occurred in the network (step S1000). After a predetermined period has passed, the management application 101a communicates with a device database (e.g., device database 102 of FIGS. 1 and 2), to obtain information which may comprise (i) switch information that may include properties of the switch (e.g., switch identifier, model no., protocol, etc.) and registered port connection information which may include the MAC address of one or more devices connected to the switch and a port number corresponding to every port on the switch and (ii) device information for devices connected to each of the switches (step S1001).

In an exemplary embodiment, the switch information stored in the device database may include information which was registered initially by the user and may include information obtained automatically (i.e. without user interaction) from the network. For example, the user may register in the device database that a switch is to be designated for a certain location (e.g., room 204). In other words, ports of the switch are connected to Ethernet ports at the location that the switch is disposed at, which are in turn connected to corresponding Ethernet ports that are in the certain location (e.g., room 204). As a result of such configuration, whenever devices are connected to the ports on the switch (via the Ethernet ports), the management application automatically knows the location of the devices and may be able to obtain information regarding the device.

However, it should also be noted that the information stored in the device database is not always current. The devices may be, on regular basis, connected to or disconnected from the ports on a switch. Thus, to determine whether any changes have occurred in the network, the management application monitors the network periodically as stated previously. In other words, after the management application obtains the information form the device database, the management application may directly communicate with the switches in the network to obtain the most recent (i.e. up-to-date) information regarding the network (step S1002).

When the management application communicates with each of the switches in the network, the management application uses the protocol (e.g., OpenFlow, Catalyst, etc.) corresponding to each switch. The reason being that each of the switches in the network may be of a different type and model. Further, such switches may be manufactured by different companies who have their own protocols and standards installed onto the switch. Consequently, due to this variety, the management application is configured to communicate using specific protocols for each of the switches in the network.

After communicating with a switch in the network, the management application requests information from the switch. Such information may include switch information that may include (i) properties of the switch (e.g., switch identifier, model no., protocol, etc.) and (ii) current port connection information which may include a port number corresponding to every port on the switch and a MAC address of each device connected to the ports. In addition, the management application 101a may also obtain device information (e.g., device type, device identifier, model no., etc.) for each of the devices connected to the ports on the switch. In other words, after the management application performs the process of retrieving information from each of the switches connected to the network, the management application can determine the switches in the network, their ports and which devices (if any) are connected to their ports. Next, the management application stores the information directly obtained from each of the switches in the network.

Subsequently, the management application compares the information retrieved from the device database (e.g., registered port connection information) to the information obtained directly from each of the switches in the network (e.g., current port connection information) to determine if there is any discrepancy (i.e. inconsistency) between the two sets of information (step S1004). In other words, discrepancy may occur, for example, when the management application determines that (i) a new device is connected to a port on a particular switch, (ii) an existing device is removed from a port on a particular switch, (iii) a new device has replaced an existing device on the same port of a particular switch, or (iv) an existing device has been moved from a port on a particular switch to a port on another particular switch.

Such determination may, for example, be performed by utilizing the current port connection information and the registered port connection information. More specifically, the management application determines whether a MAC address of a device (if any) connected to a port of a switch (in the registered port connection information) matches a MAC address of a device (if any) connected to the same port of the same switch (in the current port connection information). If matching occurs, then there is no change. Otherwise, if there is no matching, the management application may determine that there is an inconsistency. It should also be noted that the management application may also determine whether devices have been moved from one port to another on the same switch or from one switch to another. For example, the management application may determine that a particular device is missing from one of the ports of the switch. Therefore, when performing analysis on the other switches, the management application may discover the particular device (via MAC address) is connected to another port on another switch. In such a case, the management application may record this event and inform the user via notifications. In an exemplary embodiment, the notifications may include a time stamp (e.g., year, month, day, hour, minute, seconds, etc.) of when a device is added/or removed from one port to another (or from one switch to another).

In the case, that the management application determines that there is no inconsistency (step S1004, no), the device database is left unaltered and the management application waits for a predetermined period of time before performing monitoring of the network again. On the other hand, in the case that the management application determines that there is inconsistency between the information (step S1004, yes), the management application is notified that a change has occurred in the network and, therefore, verifies whether such change was authorized (step S1005). In the case that the change was in fact authorized (step S1005, yes), the management application updates the new change in information (e.g., registered port connection information is updated) with the device database (step S1006). In an exemplary embodiment, the management application may not need to notify the user of the management application that a change has occurred since the change was previously authorized.

Figure 11:
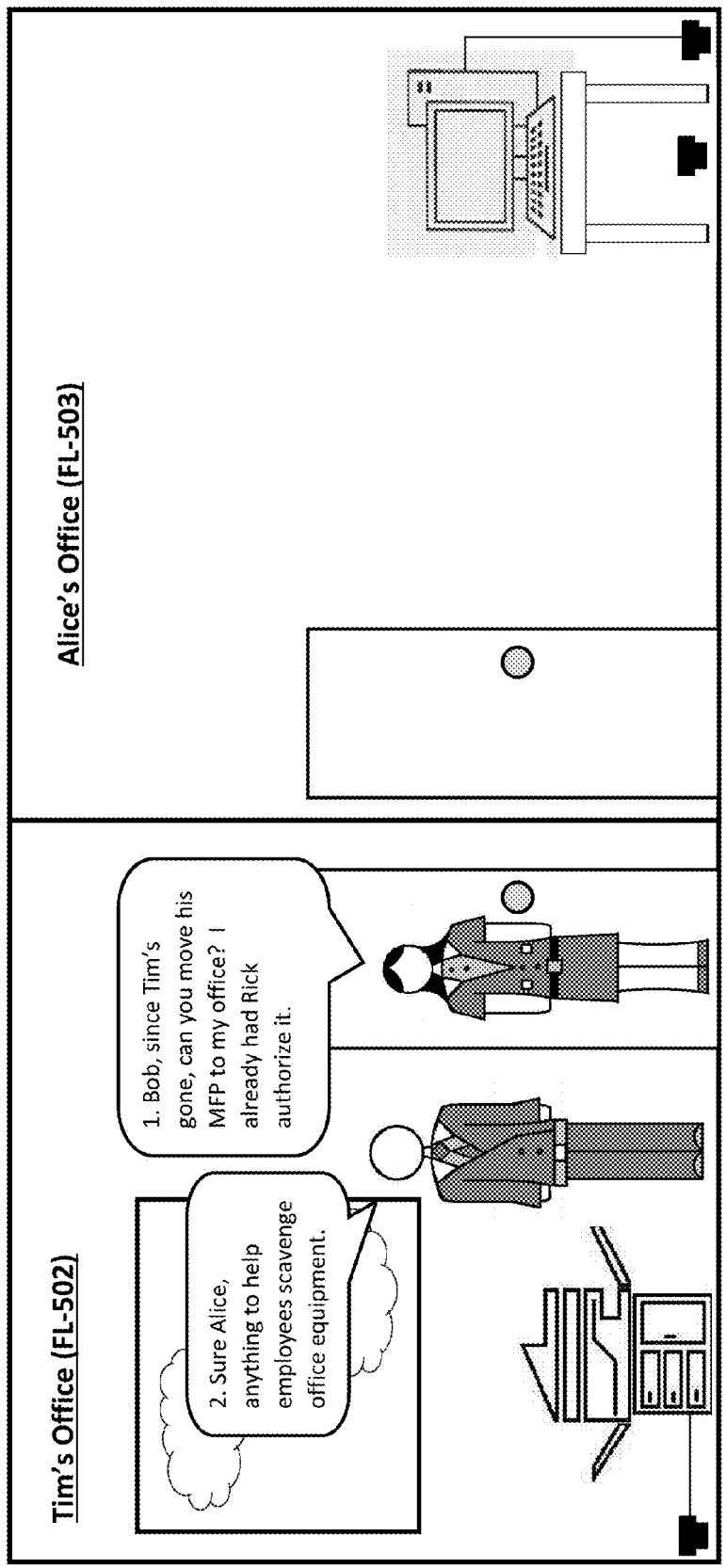
FIG. 11 shows illustratively an example of user interaction leading to relocation of a registered device.

For example, "Alice" may be an employee at a large organization which may include hundreds of offices in the building at which "Alice" works at. However, one of "Alice's" co-workers, "Tim" is leaving the company. Since "Tim" and "Alice" are good friends, he allows "Alice" to take the MFP located in his office (i.e. "FL-502"). "Tim" informs the CEO "Rick Parsons" who authorizes Tim's request by notifying the IT Manager "Jimmy Hart". After receiving "Rick's" message, "Jimmy" registers on an management application that "Rick" has authorized the move of "Tim's" MFP. Subsequently, after "Tim" is gone, "Alice" asks "Bob" (who is a subordinate to "Jimmy" and is clearing "Tim's" office) to assist her in moving the "Tim's" MFP (which is connected to an Ethernet port in "Tim's" office) to her office (i.e. "FL-503"), such as in the example shown in FIG. 11.

Figure 13:
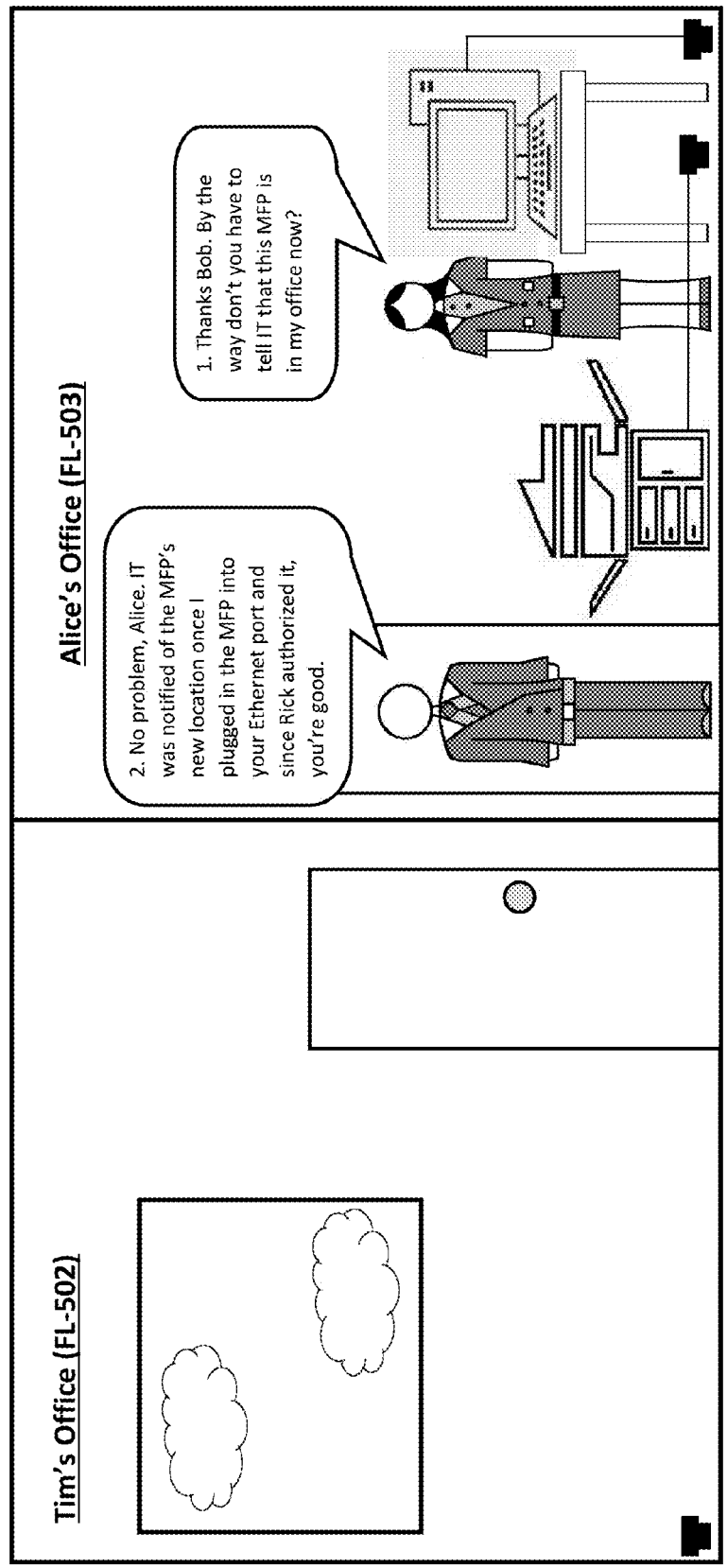
FIG. 13 shows illustratively an example of user interaction after relocation of a registered device.

In an indeterminate time period after "Tim's" MFP is moved by "Bob" and connected to an Ethernet port in "Alice's" office, the management application determines that a predetermined period has passed and, therefore, the management application is scheduled to monitor all the switches and devices in the network. After performing the monitoring, the management application discovers that "Tim's" MFP is moved from office "FL-502" to office "FL-503". However, since the move was authorized, the management application proceeds to update the device database with this new event. Nevertheless, the management application sends to "Jimmy" a notification, such as shown in FIG. 12, which informs "Jimmy" regarding the status of "Tim's" MFP (e.g., model number, MAC address, switch connected to, port number connected to, etc.). In other words, the notification informs "Jimmy" that "Tim's" MFP has been disconnected from the Ethernet port in his office on "Sep. 7, 2015" (i.e. Time Stamp) and connected to an Ethernet port in "Alice's" office on "Sep. 8, 2015" (i.e. Time Stamp). Further, the notification also informs "Jimmy" that the move has been authorized by the CEO "Rick Parson" and that the information in the device database has been updated accordingly. In addition, since the move was previously authorized, neither "Bob" nor "Alice" is required to notify IT or management, such as in the example shown in FIG. 13.

On the other hand, in the case that the change was not authorized (step S1005, no), the management application creates a notification for each of the changes that were made in the network (step S1007).

Figure 14:
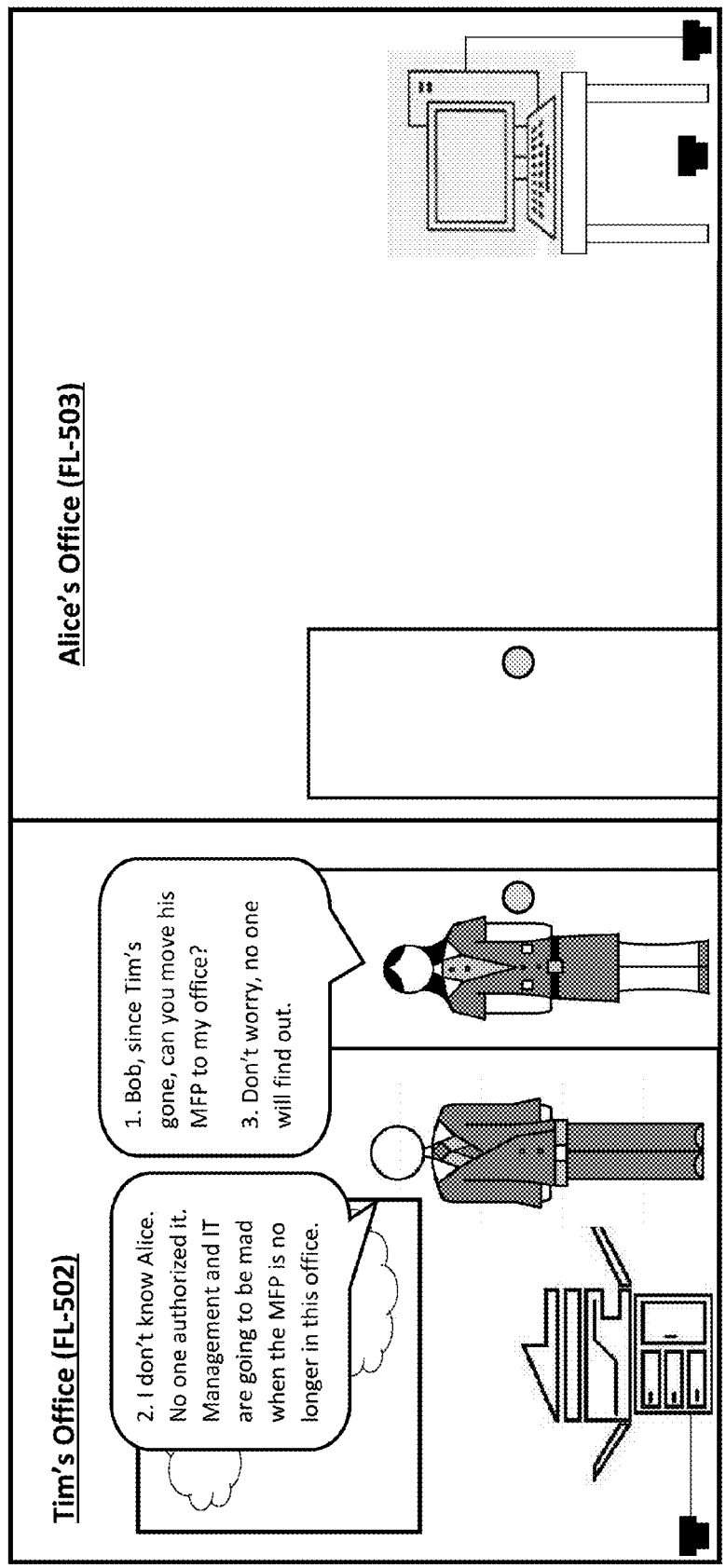
FIG. 14 shows illustratively another example of user interaction, prior to relocation of a registered device.
Figure 16:
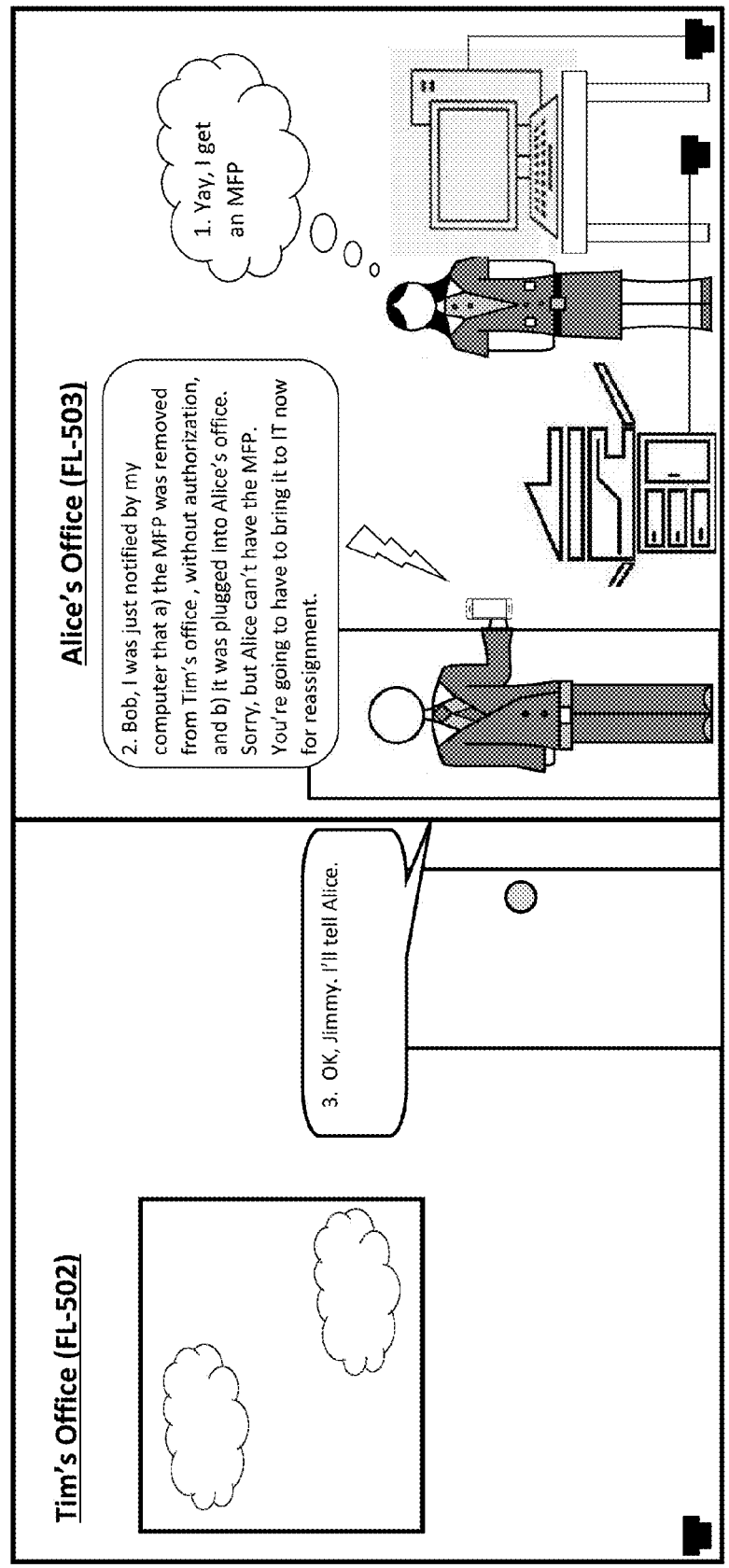
FIGS. 16 and 17 show illustratively examples of user interaction after relocation of a registered device.
Figure 17:
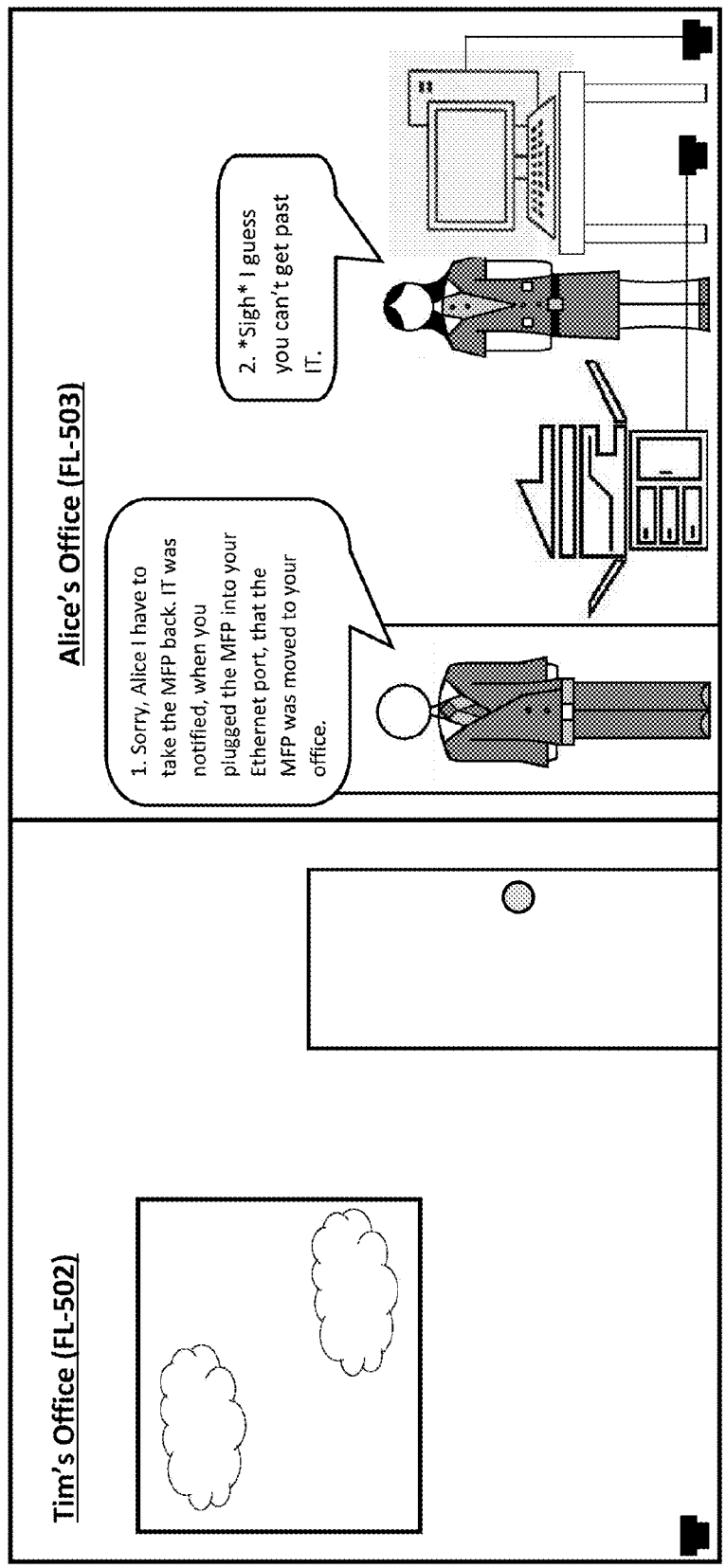

For example, the company that "Alice" works at may not allow employees to take another employee's device without prior authorization from the IT department or management. Further, devices may be assigned based on seniority. As a result, in "Alice's" case, she would never be able to obtain "Tim's" MFP. As a result, after "Tim" has left, she asks "Bob" to move "Tim's" MFP to her office to which "Bob" reluctantly complies, such as in the example shown in FIG. 14. In an indeterminate time period after "Tim's" MFP is moved by "Bob" and connected to an Ethernet port in "Alice's" office, the management application determines that a predetermined period has passed and, therefore, the management application is scheduled to monitor all the switches and devices in the network. After performing the monitoring, the management application discovers that "Tim's" MFP is moved from office "FL-502" to office "FL-503" without any authorization. Accordingly, the management application informs "Jimmy" via notifications relating to this move, such as shown in FIG. 15. Such notification include a message stating that such move was not authorized and an option for the user to either (i) update the device database of the change or (ii) no to update the device database of the change. In this case, "Jimmy" does not update the device database of the change and, instead, calls and informs "Bob" that he was aware that "Bob", without authorization, (i) removed the MFP from "Tim's" office and (ii) plugged in the MFP into "Alice's" office, such as in the example shown in FIG. 16. Further, "Bob" has to bring the MFP to the IT department for reassignment, to which "Bob" informs "Alice", such as in the example shown in FIG. 17.

Subsequently, regardless of whether the change was authorized or not, the management application sends notifications of changes in the network (if any) to the user of the management application (step S1008).

It should be noted that in an exemplary embodiment, when the user firsts sets up the system including the management application, there may not be any switches or devices registered in the device database. As a result, the user may need to manually enter all the information (e.g., location) of the switches and device. However, once the switches and devices are registered, they may automatically be updated by the management application.

Figure 18:
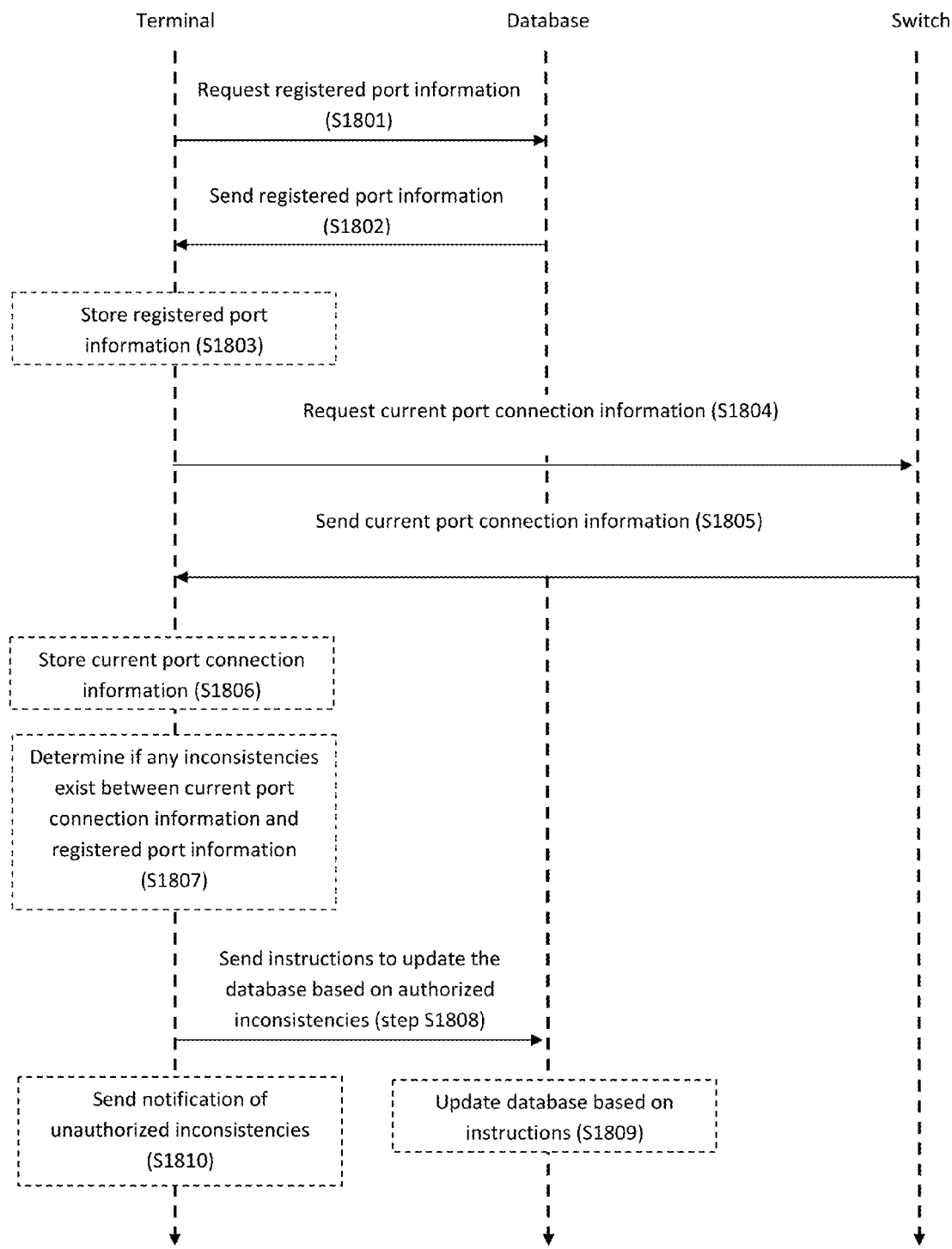
FIG. 18 shows process flow in the system shown in FIG. 1 and/or in the system shown in FIG. 2.

FIG. 18 shows a process performed in, for example, the system 200A (in FIG. 1), according to another exemplary embodiment.

For example, a terminal (e.g., terminal 101 in FIG. 1; server 107 in FIG. 2) may request registered port connection information from a database (e.g., database 102) periodically or based on a schedule (step S1801). Such registered port connection information may include information regarding all the devices in the network and which switches the devices are connected (e.g., port number, MAC address of device, etc.). Next, in response to the terminal's request, the database sends the registered port connection information to the terminal periodically (step S1802). Subsequently, the terminal stores the registered port connection information periodically (step S1803). Then, the terminal communicates with each of a switch or switches (e.g., switches 103a and 103b) to request current port connection information periodically (step S1804). Such port connection information may be an updated version of the registered port connection information or may contain the same information depending on the status of the network. In response, the switch or switches sends the current port connection information back to the terminal periodically (step S1805). Subsequently, the terminal stores the current port connection information periodically (step S1806). Next, the terminal determines whether there are any inconsistencies exist between the current port connection information and the registered port connection information (S1807). In other words, the terminal determines whether a device moved or changed locations since the last time the database was updated. When there is an inconsistency, but it was authorized, the terminal sends instructions to the database to update the information stored periodically (step S1808). In response, the database updates the information as instructed by the terminal periodically (step S1809). On the other hand, when there is an unauthorized inconsistency, the database notifies the user of the terminal periodically (step S1810).

The orders in which the steps are performed in the aforementioned methods are not limited to those shown in the examples of FIGS. 8, 10 and 18, and may be switched as long as similar results are achieved. Also, it should be noted that the methods or processes illustrated in the examples of FIGS. 8, 10 and 18 may be implemented using any of the systems described in connection with FIGS. 1 and 2.

The aforementioned specific embodiments are illustrative, and many variations can be introduced on these embodiments without departing from the spirit of the disclosure or from the scope of the appended claims. For example, various aspects, features and advantages disclosed herein can applied to automate device driver installation, even when the device for which the driver is needed does not have any print functionality. Further, although the aspects, features and advantages are discussed herein in connection with a print application, it should be understood that such aspects and feature may be integrated in a program that is not application software per se, but may be instead, for example, an operating system, a snap-in, a plug-in, an add-on, an extension, or another program not normally referenced as an application.

In addition, elements and/or features of different examples and illustrative embodiments may be combined with each other and/or substituted for each other within the scope of this disclosure and appended claims.

What is claimed is:

1. A non-transitory storage medium stored one or more programs of instructions, the one or more programs of instructions further includes an asset management application or program configured for managing a fleet of printer and multi-function devices and switches over a network and maintaining a device database and are executable by a processor of a host computer, to configure the host computer to comprise:

a switch communication module to communicate through a network interface and over the network, with a target device switch including plural ports configured for connection of respective the printer and the multi-function devices;

a switch management module to monitor the target device switch and register, for the target device switch and in the device database, port information indicating connected devices connected to the ports of the target device switch, and obtain by communication through the switch communication module from the target device switch, for each managed port amongst the ports of the target device switch, current port connection information indicating a currently connected device connected to the managed port, wherein the switch management module compares (i) the current port connection information obtained from the target device switch indicating the currently connected device connected to the managed port with (ii) registered port information indicating the connected devices connected to the ports of the target device switch, and when the current port connection information of the managed port is inconsistent with the registered port information, for the target device switch, the switch management module sends a notification identifying the target device switch and indicating the inconsistency between the current port connection information and the registered port information, to an administrator.

2. The non-transitory storage medium as claimed in claim 1, wherein the asset management application maintains in the device database, for each managed device, device location information indicating a specified device switch to which the managed device is connected, and when the switch management module determines that the connected device determined as connected currently to the managed port of the target device switch is indicated in the device database as being connected to another port of the target device switch, the asset management application sends the notification to the administrator identifying the managed device and indicating that the managed device has been determined as having been moved to a different port of the target device switch.

3. The non-transitory storage medium as claimed in claim 1, wherein the asset management application maintains in the device database, for each managed device, device location information indicating a specified device switch to which the managed device is connected, and when the switch management module determines that the connected device determined as connected currently to the managed port of the target device switch is indicated in the device database as being connected to another device switch, the asset management application sends a notification to the administrator identifying the managed device and indicating that the managed device has been determined as having been moved to a different device switch.

4. The non-transitory storage medium as claimed in claim 1, wherein the asset management application maintains in the device database, for each managed device, a media access address of the managed device, and the switch management module transmits a query, by the communication through the switch communication module, to the target device switch, to obtain the current port connection information, including, for each port amongst the ports of the target device switch, the media access address of a device connected to the port amongst the ports of the target device switch.

5. The non-transitory storage medium as claimed in claim 4, wherein the asset management application includes an automatic update mode in which when the switch management module determines that the media access address of the connected device that is connected to the managed port of the target device switch, as indicated in the current port connection information, is inconsistent with the registered port information for the target device switch, the switch management module updates the port information registered for the managed port of the target device switch to show that the connected device is connected to the managed port.

6. The non-transitory storage medium as claimed in claim 4, wherein the asset management application additionally registers information indicating date and time of the update to the port information registered for the managed port of the target device switch.

7. The non-transitory storage medium as claimed in claim 4, wherein when the switch management module determines that the media access address of the connected device that is connected to the managed port of the target device switch, as indicated in the current port connection information, is inconsistent with the registered port information for the target device switch, the switch management module determines whether the connected device determined to be connected currently to the managed port is indicated in the device database as being connected to another device switch.

8. The non-transitory storage medium as claimed in claim 7, wherein the asset management application maintains in the device database, for each managed device, device location information indicating a specified device switch to which the managed device is connected, and when the switch management module determines that the connected device determined to be connected currently to the managed port of the target device switch is indicated in the device database as being connected to another device switch or another port, the asset management application updates the device location information registered in the device database for the connected device to show that the connected device is connected to the managed port of the target device switch.

9. The non-transitory storage medium as claimed in claim 8, wherein the asset management application additionally registers information indicating date and time of the update to the device location information registered in the device database for the connected device.

10. The non-transitory storage medium as claimed in claim 1, wherein the asset management application polls managed device switches according to a device polling schedule, to obtain from each managed device switch amongst the managed device switches, a network address of each connected device connected to the ports of the managed device switch, and the asset management application updates the port information registered in the device database for the managed device switch to reflect the network address of said each connected device connected to the ports of the managed device switch.

11. The non-transitory storage medium as claimed in claim 1, wherein the asset management application maintains in the device database, for each particular managed device, information registered for the particular managed device to indicate a communication protocol to be used for the communication with the particular managed device, and the asset management application includes an automatic update mode in which the asset management application polls each subject device switch amongst plural managed device switches, in turn, according to an information update schedule, to communicate with the subject device switch according to the registered communication protocol of the subject device switch to obtain device port information of the subject device switch and then update the port information of the subject device switch.

12. The non-transitory storage medium as claimed in claim 1, wherein the asset management application provides a user interface configured to permit an authorized user to (i) add a specified device switch to the device database and input and edit information to be registered in the device database for the added device switch, and (ii) delete a registered device switch.

13. The non-transitory storage medium as claimed in claim 12, wherein the information registered in the device database for the added device switch includes security credentials associated with the added device switch, and the user is required to specify credentials matching the security credentials, before the user interface permits the user to access the registered information for the added device switch.

14. The non-transitory storage medium as claimed in claim 12, wherein the asset management application registers in the device database security credentials associated with the added device switch and required for querying the added device switch.

15. The non-transitory storage medium as claimed in claim 1, wherein user interface provided by the asset management application permits authorized user to enter authorization for a location change of a managed device, within a specified time period.

16. A system in which plural devices are connected to a network, the system comprising:
- a fleet of printer and multi-function devices and switches;
- a device database; and
- a management apparatus configured for managing the fleet of printer and the multi-function devices and switches over the network and maintaining the device database, the management apparatus including a processor and a storage device storing one or more programs of instructions executable by the processor of the management apparatus to configure the management apparatus to comprise:
- a switch communication module to communicate through a network interface and over the network, with a target device switch including plural ports configured for connection of respective printer and multi-function devices;
- a switch management module to monitor the target device switch and register, for the target device switch and in the device database, port information indicating connected devices connected to the ports of the target device switch, and obtain by communication through the switch communication module from the target device switch, for each managed port amongst the ports of the target device switch, current port connection information indicating a currently connected device connected to the managed port,
- wherein the switch management module compares (i) the current port connection information obtained from the target device switch indicating the currently connected device connected to the managed port with (ii) registered port information indicating the connected devices connected to the ports of the target device switch, and when the current port connection information of the managed port is inconsistent with the registered port information, for the target device switch, the switch management module sends a notification identifying the target device switch and indicating the inconsistency between the current port connection information and the registered port information, to an administrator.

17. A method performed by a management apparatus configured for managing a fleet of printer and multi-function devices and switches over a network, the method comprising:
- registering, in a device database, the plural device switches and, for each managed device switch amongst the plural device switches, port information indicating ports of the managed device switch and indicating, for each managed port amongst the ports of the managed device switch, a device connected to the managed port;
- communicating, according to an information update schedule, through the network with each target device switch amongst the plural device switches, to obtain, from the target device switch, port connection information indicating, for each managed port of the target device switch, the device connected to the managed port;
- comparing the port connection information to the port information registered in the device database for the target switch device, and determining whether the port connection information of the managed port is inconsistent with registered port information; and
- when the port connection information of the managed port is inconsistent with the registered port information, for the target device switch, sending a notification identifying the target device switch and indicating the inconsistency between the current port connection information and the registered port information, to an administrator.

* * * * *